United States Patent [19]
Moriyama et al.

[11] Patent Number: 5,895,876
[45] Date of Patent: Apr. 20, 1999

[54] SOUND REPRODUCING APPARATUS WHICH UTILIZES DATA STORED ON A RECORDING MEDIUM TO MAKE THE APPARATUS MORE USER FRIENDLY AND A RECORDING MEDIUM USED IN THE APPARATUS

[75] Inventors: Yoshiaki Moriyama; Kouichi Ono, both of Tsurugashima; Tatsuyuki Miyazawa; Hiroshi Fujii, both of Tokyo; Masahiko Miyashita; Sumio Hosaka, both of Tokorozawa, all of Japan

[73] Assignee: Pioneer Electronic Corporation, Tokyo, Japan

[21] Appl. No.: 08/719,466

[22] Filed: Sep. 25, 1996

Related U.S. Application Data

[62] Division of application No. 08/249,837, May 26, 1994.

[30] Foreign Application Priority Data

| May 26, 1993 | [JP] | Japan | 5-124067 |
| Jun. 18, 1993 | [JP] | Japan | 5-148156 |
| Jul. 20, 1993 | [JP] | Japan | 5-178960 |
| Jul. 23, 1993 | [JP] | Japan | 5-182912 |
| Jul. 23, 1993 | [JP] | Japan | 5-182913 |

[51] Int. Cl.⁶ .............. A63H 5/00; G04B 13/00; G10H 7/00
[52] U.S. Cl. .............................. 84/609; 84/634
[58] Field of Search .............. 84/600, 601, 609, 84/610, 634, 645

[56] References Cited

U.S. PATENT DOCUMENTS

| 5,107,343 | 4/1992 | Kawai . |
| 5,157,643 | 10/1992 | Suzuki . |
| 5,194,682 | 3/1993 | Okamura et al. ............... 434/307 A |
| 5,243,582 | 9/1993 | Yamauchi et al. . |
| 5,245,600 | 9/1993 | Yamauchi et al. . |
| 5,247,126 | 9/1993 | Okamura et al. ............... 84/609 |
| 5,250,745 | 10/1993 | Tsumura et al. ............... 84/603 |
| 5,252,775 | 10/1993 | Vrano ............... 84/645 |
| 5,286,907 | 2/1994 | Okamura et al. ............... 434/370 A |
| 5,410,097 | 4/1995 | Kato et al. ............... 84/610 |
| 5,410,100 | 4/1995 | Kim ............... 84/645 |
| 5,446,714 | 8/1995 | Yoshio et al. . |
| 5,454,723 | 10/1995 | Horii . |
| 5,544,139 | 8/1996 | Aramaki et al. . |
| 5,589,947 | 12/1996 | Sato et al. ............... 84/645 X |
| 5,589,949 | 12/1996 | Sato et al. . |

FOREIGN PATENT DOCUMENTS

| 465246 | 1/1992 | European Pat. Off. . |
| 3120686 | 5/1991 | Japan . |
| 4011288 | 1/1992 | Japan . |
| 4191897 | 7/1992 | Japan . |
| 5061492 | 3/1993 | Japan . |
| 5062435 | 3/1993 | Japan . |

*Primary Examiner*—Stanley J. Witkowski
*Assistant Examiner*—Jeffrey W. Donels
*Attorney, Agent, or Firm*—Sughrue, Mion, Zinn, Macpeak & Seas, PLLC

[57] ABSTRACT

A karaoke reproducing apparatus is equipped a measure for easily checking whether a music piece selected by the user has correctly been accepted or not. The apparatus has a memory in which music title name information of each of the music pieces recorded on a recording medium has previously been stored. When one of the plurality of music pieces is selected by an operation, the music title name information of the selected music piece is soon displayed by characters. The apparatus also has memory means in which music piece classification information of each of the music pieces recorded on the recording medium has previously been stored. An item content selection command to designate the contents of at least one of a plurality of different items included in the music piece classification information is generated in accordance with an operation. The music piece corresponding to the contents of at least one item indicated by the item content selection command is searched for by using the information from the memory means.

32 Claims, 29 Drawing Sheets

FIG. 6

| PLAYING ORDER | MUSIC PIECE SELECTION NUMBER | RECORDING FLAG |
|---|---|---|
| 1 | 7 6 0 4 | 0 |
| 2 | 1 2 1 0 | 1 |
| 3 | 3 4 0 6 | 1 |
| 4 | 5 4 1 2 | 0 |
| ⋮ | ⋮ | ⋮ |

FIG. 7

| COPYRIGHT CODE | COPYRIGHT OWNER'S NAME | PERMISSION OR INHIBITION OF RECORDING |
|---|---|---|
| 0 | NOTE | 1 |
| 1 | COMPANY A | 1 |
| 2 | COMPANY B | 1 |
| 3 | COMPANY C | 0 |
| 4 | COMPANY D | 1 |
| 5 | COMPANY E | 0 |

FIG. 13

```
SELECTION CLASSIFICATION

1. MAIN THEME IMAGE OF MUSIC PIECE
   AND MUSIC PIECE THEME
2. SITUATION OF MUSIC PIECE
3. SPECIAL GENRE OF MUSIC PIECE
4. END

SELECT BY NUMBER
```

| MAIN THEME IMAGE OF MUSIC PIECE ||
|---|---|
| CONTENTS | SELECTION NUMBER |
| LOVE | 1 |
| LIFE | 2 |
| OTHERS | 3 |

FIG.15

| MAIN THEME IMAGE | MUSIC PIECE THEME | |
|---|---|---|
| | CONTENTS | SELECTION NUMBER |
| LOVE | ILLICIT LOVE (LIAISON, ETC) | 1 |
| | UNRETURNED LOVE (MAN→WOMAN) | 2 |
| | UNRETURNED LOVE (WOMAN→MAN) | 3 |
| | LOST LOVE (HEATBURNING, ANGER) | 4 |
| | LOST LOVE (RELUCTANCE, REGRET) | 5 |
| | DECLARATION OF LOVE (MAN→WOMAN) | 6 |
| | DECLARATION OF LOVE (WOMAN→MAN) | 7 |
| | MUTUAL LOVE (HAPPINESS) | 8 |
| | ENCOUNTER | 9 |
| | SEPARATION | 10 |
| | ⋮ | ⋮ |
| LIFE | TRAVEL | 1 |
| | ALCOHOL | 2 |
| | MARRIED COUPLE | 3 |
| | PARENT AND CHILD | 4 |
| | BROTHER AND SISTER | 5 |
| | HOME TOWN | 6 |
| | MEMORY | 7 |
| | DREAM | 8 |
| | JOY OF LIFE | 9 |
| | SADNESS (BITTERNESS) OF LIFE | 10 |
| | ⋮ | ⋮ |
| OTHERS | WAR | 1 |
| | OTHERS | 2 |

FIG.16

| SITUATION OF MUSIC PIECE | |
|---|---|
| CONTENTS | SELECTION NUMBER |
| CHRISTMAS | 1 |
| BIRTHDAY | 2 |
| VALENTINE'S DAY | 3 |
| MARRIAGE, PROPOSAL | 4 |
| GRADUATION | 5 |
| BAR, PUB RESTAURANT | 6 |
| TRAIN, SHIP, AIRPLANE | 7 |
| HARBOR, STATION, AIRPORT | 8 |
| INN, HOTEL | 9 |
| TRIP | 10 |
| ⋮ | ⋮ |

FIG.17

| SPECIAL GENRE OF MUSIC PIECE | |
|---|---|
| CONTENTS | SELECTION NUMBER |
| CM SONG | 1 |
| TV DRAMA MAIN THEME SONG | 2 |
| OTHER THEME SONG | 3 |

FIG. 19

| CONTENTS | SELECTION NUMBER |
|---|---|
| NEW MUSIC • LOST LOVE | 1 |
| ENKA • HOME TOWN | 2 |
| POPS • SEA | 3 |
| ⋮ | ⋮ |

FIG. 20

| CONTENTS | SELECTION NUMBER |
|---|---|
| WOOING SONG BEFORE 1970s | 1 |
| WOOING SONG 1980s | 2 |
| WOOING SONG 1990s | 3 |
| NEWEST CM SONG, TV DRAMA MAIN THEME SONG | 4 |
| MOMENTARY BIG HIT SONG | 5 |
| ⋮ | ⋮ |

FIG. 21

| BIT NO. | CONTROL APPARATUS |
|---|---|
| 15 | ILLUMINATION CONTROL APPARATUS |
| 14 | VIDEO EFFECT APPARATUS, CAMERA CONTROL APPARATUS |
| 13 | SMOKE APPARATUS |
| 12 | SOAP BUBBLE GENERATING APPARATUS |
| 11 | AUDIO PROCESSING APPARATUS |
| 10 ~ 0 | NOT DEFINED |

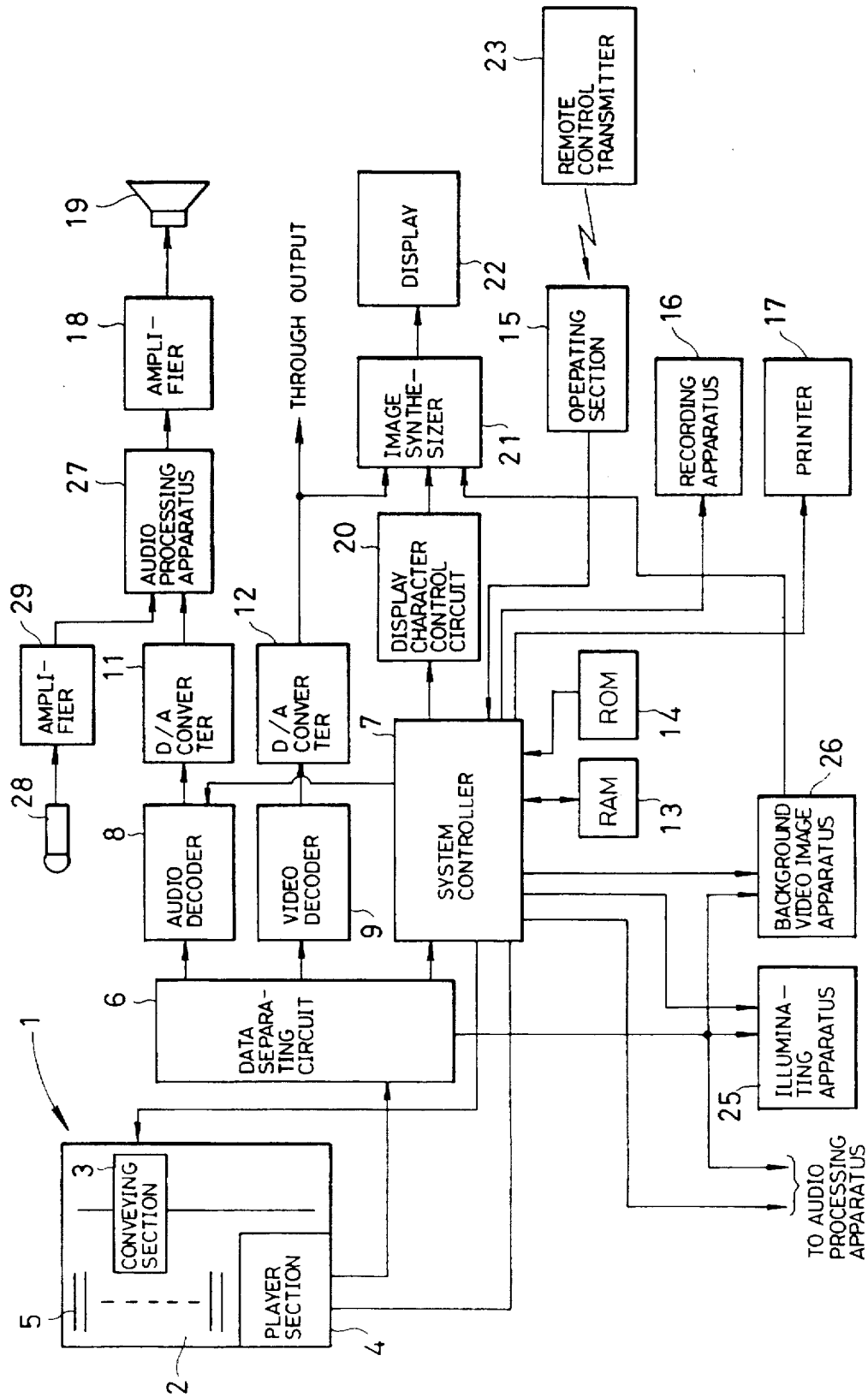

X DIRECTION

Y DIRECTION

SOUND REPRODUCING APPARATUS WHICH UTILIZES DATA STORED ON A RECORDING MEDIUM TO MAKE THE APPARATUS MORE USER FRIENDLY AND A RECORDING MEDIUM USED IN THE APPARATUS

This Application is a division of Ser. No. 08/249,837 filed May 26, 1994.

BACKGROUND OF THE INVENTION

1. Field of the Invention

The present invention relates to a karaoke reproducing apparatus which has a recording medium on which karaoke playing sounds of a plurality of music pieces have been recorded and which is used to reproduce the playing sounds of selected one of the plurality of music pieces.

The invention further relates to a recording disc on which information such as characters, figure, and the like have been recorded as an image and to an information reproducing apparatus for reproducing the recording information from such a recording disc.

2. Description of Background Information

Karaoke reproducing apparatuses are generally designed that a music piece selection number (music piece code) which is predetermined for each music piece is input by a key operation when the user selects a desired music piece from a plurality of karaoke music pieces. After the music piece selection number has been input as mentioned above, when the playing order of the desired music piece comes, the karaoke playing sound of the music piece corresponding to the music piece selection number is generated from the karaoke reproducing apparatus.

In conventional karaoke reproducing apparatuses, some apparatuses are devised to display the music piece selection number which has been input by the key operation so as to allow the user to confirm whether or not the key operation by the user has been correctly executed. However, when the key operation is performed by a user who has mistaken the correspondence between the desired music piece and the music piece selection number, the user will not notice such a mistake when seeing only the display of the music piece selection number. This will result that the desired music piece is not actually outputted from the karaoke reproducing apparatus as a playing sound, after the lapse of a long waiting time.

Furthermore, when selecting a music piece, the user cannot select the music piece unless he knows at least a music title name or a singer name of the music piece which he wants to sing.

In some conventional karaoke reproducing apparatuses, external apparatuses such as illuminating apparatus, background video image apparatus, and the like are controlled in correspondence to the karaoke playing sound obtained by playing the recording medium. For instance, in the case of the illuminating apparatus, color and illuminance of the illumination change in accordance with the karaoke playing music piece. In the case of the background video image apparatus, the background video image of the word video image of the playing music piece which is displayed on the display corresponds to the contents of the playing music piece. Such external control information has previously been stored in a memory in the karaoke reproducing apparatus every music piece. When a music piece is selected, the corresponding external control information is read out from the memory, thereby controlling the external apparatus.

In the conventional karaoke reproducing apparatus, however, in the case of controlling the external apparatus in accordance with the karaoke playing in a real-time manner, it is necessary to set the external apparatus into an operative set state before playing every music piece. Due to this, since control set information of the external apparatus of the number as many as the number of music pieces which can be selected must be stored into the memory, there is a problem such that a capacity of the memory and costs increase. When a new karaoke music piece is added, since control set information of the external apparatus of the new music piece must be preliminarily stored into the memory, the troublesome operation is necessary.

On the other hand, in the conventional karaoke reproducing apparatus, the external apparatuses such as illuminating apparatus, background video image apparatus, and the like are controlled in a real-time manner in correspondence to the karaoke playing sound obtained by the playing of the recording medium. In this case, real-time data has been recorded together with the playing sound on the recording medium. When playing, the real-time data is read out from the recording medium together with the playing sound. In accordance with the read-out real-time data, for example, in the case of the illuminating apparatus, the color and illuminance of the illumination change, and in the case of the background video image apparatus, the background video image of the word video image of the playing music piece which is displayed on the display corresponds to the contents of the playing music piece.

In such a conventional karaoke reproducing apparatus which controls the external apparatus in accordance with the karaoke playing in a real-time manner, however, the real-time data must be provided for each external apparatus to be controlled. Namely, as for the real-time data recorded on the recording medium, there is a fixed relationship between the real-time data and the external apparatus which is to be controlled by the data, as in the case of a real-time data that is solely used for controlling the illuminating apparatus. There is no freedom of degree such that an arbitrary external apparatus is connected or the control contents are changed in accordance with the external apparatus which is connected.

In the karaoke system, further, there is known a system in which in addition to the operation such that a karaoke music piece and a voice sound of a singer are synthesized and outputted as an audio sound, a video image corresponding to the atmosphere of the karaoke music piece and the words information of the music piece are displayed, thereby supporting the singer.

In such a karaoke system, recording information is read out from a recording disc such as LD (Laser Disc), CD (Compact Disc), or the like, on which audio signals, video signals, and character signals to form words corresponding to karaoke music pieces have been recorded, the reproduction audio signal, reproduction video image signal, and reproduction character signal are obtained, and a desired signal process is executed to each of those reproduction signals, thereby executing the acoustic generation and the display as mentioned above. For instance, the reproduction audio signal and the voice signal obtained from the singer are synthesized and the synthetic signal is outputted as an audio sound by a speaker. The reproduction character signal and the reproduction video image signal are synthesized and the synthetic signal is displayed on the display synchronously with the acoustic output timing of the reproduction audio signal. With such a construction, the video image and words information are displayed on the display in accordance with the progress of the karaoke music piece.

In this instance, as a method of converting characters to form the words into a data signal as mentioned above, a method of using character font data and a method of recognizing a shape of character as one image character and using the image data which expresses the shape of character by a set of dots of a minimum unit are considered. In the above karaoke system, the latter method using the image data is used in order to reduce the costs of the apparatus.

When the size of character (hereinafter, generically referred to as a character) to be displayed on the display is large, therefore, since the number of dots to form one character also increase, a data amount of the image data signal which is recorded on the recording disc also increases. When the data amount increases as mentioned above, further, it takes a time to read the data from the recording disc, so that there is a problem such that there occurs a case where the synchronization with the above reproduction audio signal cannot be preferably performed.

OBJECTS AND SUMMARY OF THE INVENTION

It is the first object of the present invention to provide a karaoke reproducing apparatus which can easily discriminate whether a music piece selected by the user could be correctly accepted or not.

The second object of the invention is to provide a karaoke reproducing apparatus which can select a desired music piece even if the user doesn't know a music title name, a singer name, or the like of a music piece which the user wants to sing or can select a music piece having a desired function.

The third object of the invention is to provide a karaoke reproducing apparatus which can properly control an external apparatus after the start of the karaoke playing even if a memory of a large capacity for storing control set information of the external apparatus is not provided in the apparatus.

The fourth object of the invention is to provide a karaoke reproducing apparatus which can control an arbitrary external apparatus and can change the control contents of the external apparatus.

The fifth object of the invention is to provide a recording disc which can reduce a data amount of character/figure information to be recorded on a recording disc and to provide a recording information reproducing apparatus.

According to the first feature of the invention, there is provided a karaoke reproducing apparatus comprising: a recording medium on which at least karaoke playing sounds of a plurality of music pieces have been recorded; means for generating a selection music piece instruction indicating one of a plurality of music pieces in accordance with an operation; and playing means for playing the recording medium with respect to the one music piece corresponding to the selection music piece instruction, wherein the apparatus includes a memory in which music title name information of each of the music pieces recorded on the recording medium has previously been stored, reading means for reading out the music title name information corresponding to the selection music piece instruction from the memory when the selection music piece instruction is generated, and displaying means for displaying the read-out music title name information by characters.

In the karaoke reproducing apparatus according to the first feature of the invention, when one music piece is selected from a plurality of music pieces by the operation, the music title name information of the selected music piece is immediately displayed by characters.

According to the second feature of the invention, there is provided a karaoke reproducing apparatus which has a recording medium on which at least karaoke playing sounds of a plurality of music pieces have been recorded and reproduce the playing sound of the selected music piece in the plurality of music pieces by playing the recording medium, wherein the apparatus comprises: memory means in which music piece classification information of each of music pieces recorded on the recording medium has previously been stored; instructing means for generating an item content selecting instruction to designate the contents of at least one of a plurality of different items included in the music piece classification information in accordance with an operation; and searching means for searching for the music piece corresponding to the contents of at least the one item indicated by the item content selecting instruction from the memory means.

According to the second feature of the invention, there is provided a karaoke reproducing apparatus having memory means in which music piece classification information of each of the music pieces recorded on a recording medium has previously been stored, an item content selecting instruction to designate the contents of at least one of a plurality of different items included in the music piece classification information is generated in accordance with an operation, and the music piece corresponding to the contents of at least the one item indicated by the item content selecting instruction is searched for through the memory means.

According to the third feature of the invention, there is provided a karaoke reproducing apparatus which can reproduce karaoke playing sounds and can also simultaneously generate real-time data for controlling an external apparatus, wherein the apparatus comprises: a recording medium on which at least karaoke playing sounds of a plurality of music pieces and control set information of the external apparatus corresponding to each of music pieces have been recorded; means for generating a selection music piece instruction indicating one of the plurality of music pieces in accordance with an operation, playing means for playing the recording medium with respect to the one music piece according to the selection music piece instruction; and means for reading out the control set information corresponding to the selection music piece instruction from the recording medium before the start of the playing by the playing means and for setting the external apparatus into a set state corresponding to the control set information which has been read out.

In the karaoke reproducing apparatus according to the third feature of the invention, when one music piece is selected from a plurality of music pieces by the operation, the control set information of the selected music piece is read out from the recording medium and the external apparatus is set into the set state corresponding to the control set information and, after that, the playing of the selected music piece is started.

According to the fourth feature of the invention, there is provided a karaoke reproducing apparatus which can reproduce a karaoke playing sound and can also simultaneously control an external apparatus, wherein the apparatus comprises: a recording medium on which at least karaoke playing sounds of a plurality of music pieces and real-time data which corresponds to each of music pieces and changes in accordance with the music piece playing have been recorded; means for generating a selection music piece instruction indicating one of a plurality of music pieces in accordance with an operation; playing means for playing the recording medium with respect to the one music piece corresponding to the selection music piece instruction and for simultaneously outputting the real-time data; and converting means for converting the real-time data outputted from the playing means and for supplying the converted data to the external apparatus.

In the karaoke reproducing apparatus according to the fourth feature of the invention, when one music piece is selected from a plurality of music pieces by the operation, the recording medium is played with respect to the selected music piece, the real-time data is obtained simultaneously with the reproduction of the karaoke playing sound, and the real-time data is converted so as to be adapted to the external apparatus and is supplied to the external apparatus.

According to the fifth feature of the invention, there is provided a recording disc on which character/figure information has been recorded as a character signal indicative of the image data, wherein the recording disc comprises: a character data section in which the character signal has been recorded; and a header section which is provided at a head position of the character data section and in which an enlargement ratio designation signal to designate an enlargement ratio on a display based on the character signal has been recorded.

According to the fifth feature of the invention, there is provided a recording information reproducing apparatus for reproducing recording information from a recording disc on which a character signal indicating character/figure information and an enlargement ratio designation signal to designate an enlargement ratio on the display based on the character signal have been recorded, wherein the apparatus comprises: reading means for reading out the character signal and the enlargement ratio designation signal from the recording disc, respectively; enlargement operating means for performing an enlargement arithmetical operation to the character signal at the enlargement ratio indicated by the enlargement ratio designation signal, thereby obtaining an enlargement character signal; and displaying means for displaying on the basis of the enlargement character signal.

BRIEF DESCRIPTION OF THE DRAWINGS

FIG. 6 is a diagram showing a selection music piece list table;

FIG. 7 is a diagram showing a recording permission/inhibition data table;

FIG. 13 is a diagram showing a display picture plane of classification items of music piece classification information;

FIG. 14 is a diagram showing the contents and selection numbers of a main theme image of music pieces;

FIG. 15 is a diagram showing the contents and selection numbers of music piece themes;

FIG. 16 is a diagram showing the contents and selection numbers of situations of music pieces;

FIG. 17 is a diagram showing the contents and selection numbers of special genre of music pieces;

FIG. 19 is a diagram showing the contents and selection numbers of combination of a plurality of items;

FIG. 20 is a diagram showing the contents and selection numbers according to a classification different from the music piece classification information regarding music pieces;

FIG. 21 is a diagram showing an example of control device information;

FIG. 22 is a block diagram showing an embodiment of the invention;

DETAILED DESCRIPTION OF THE PREFERRED EMBODIMENTS

An embodiment of the invention will now be described in detail hereinbelow with reference to the drawings.

Figure 1:
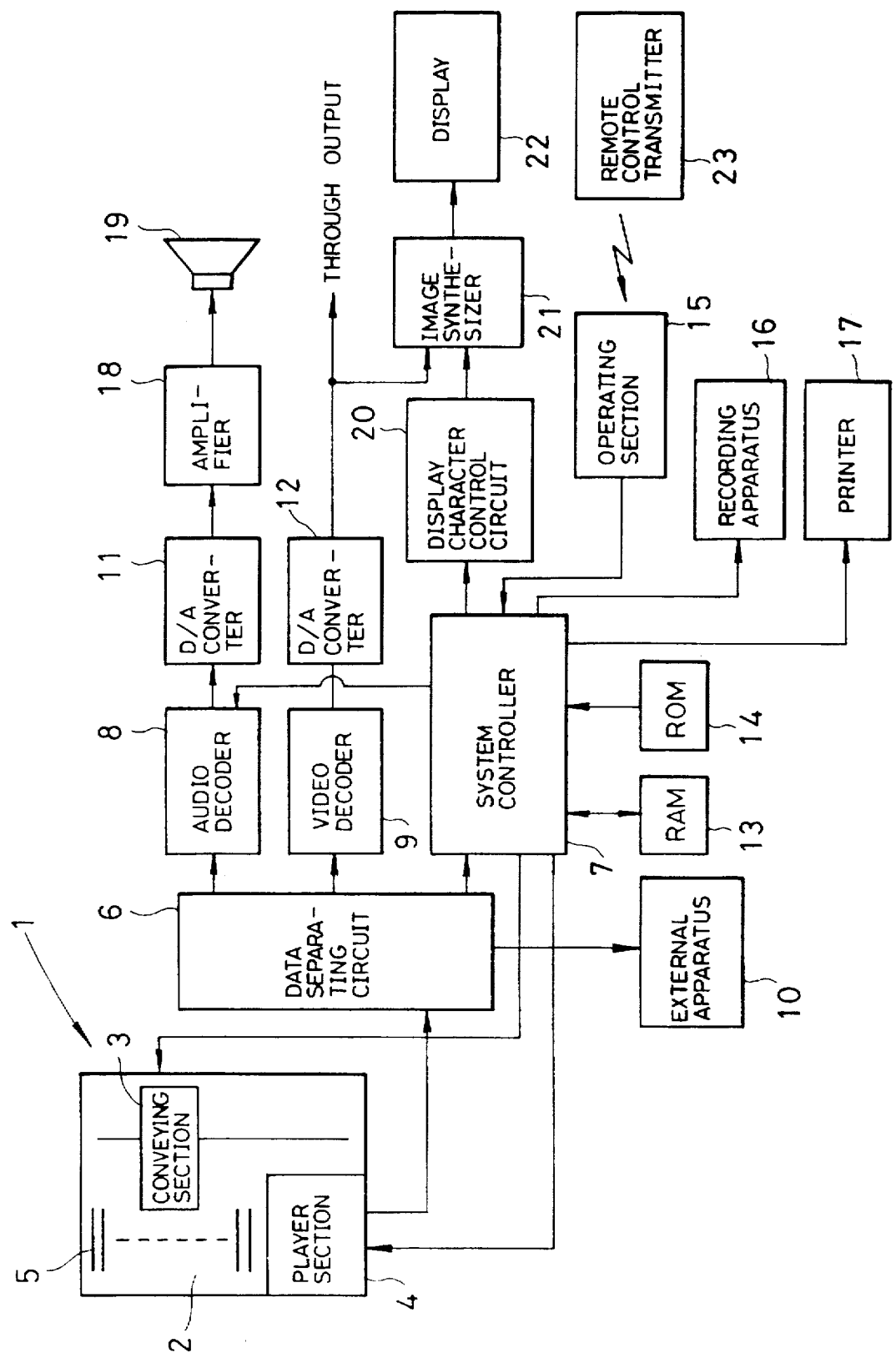
FIG. 1 is a block diagram showing an embodiment of the present invention.

In a karaoke reproducing apparatus shown in FIG. 1, a disc enclosing section 2, a disc conveying section 3, and a player section 4 are provided in an automatic changer 1. A plurality of discs 5 are enclosed in the disc enclosing section 2. When a disc is played, one of the plurality of discs 5 is conveyed onto a turntable (not shown) of the player section 4 by the conveying section 3. When the playing is finished, the disc on the turntable is returned to a position where it was in the disc enclosing section 2 by the conveying section 3. The player section 4 plays the disc on the turntable and outputs read data. The disc conveying section 3 and player section 4 operate in accordance with commands from a system controller 7, which will be explained hereinbelow.

A data separating circuit 6 is connected to a data output of the player section 4. The data separating circuit 6 separates the data outputted from the player section 4 into various kinds of data such as compressed image data, compressed audio data, control data, information data, and the like and outputs those data from individual output terminals. In addition to the foregoing system controller 7, an audio decoder 8 and a video decoder 9 are connected to the data separating circuit 6. The data separating circuit 6 has a terminal to connect an external apparatus 10. The external apparatus 10 is a controller for karaoke presentations such as illumination, video image, telop, and the like.

The audio decoder 8 decodes the separated compressed audio data and reconstructs as non-compressed audio data such as PCM digital data or the like. Since audio data of a plurality of channels has been compressed in the compressed audio data, the audio data of the channel designated in accordance with a signal from the system controller 7 is reconstructed. The audio data outputted from the audio decoder 8 is supplied to a D/A converter 11 and converted into the analog audio signal. The analog audio signal is supplied to a speaker 19 through an amplifier 18.

The video decoder 9 decodes the separated compressed image data and reconstructs as non-compressed image data. The image data outputted from the video decoder 9 is supplied to a D/A converter 12 and converted into the analog moving image video signal. The moving image video signal is directly outputted as a through output and is also supplied to an image synthesizer 21.

The system controller 7 comprises a microcomputer and receives the separated information data. The information data is stored into an RAM (random access memory) 13 and is also selectively read out from the RAM 13. The read-out information data is processed in the system controller 7 or is supplied to a display character control circuit 20. The display character control circuit 20 has a character generator and a V-RAM and produces the display character data according to the information data and writes into the V-RAM. The control circuit 20 also reads out the display character data from the V-RAM synchronously with a sync signal of the above moving image video signal and converts it into the character video image signal and supplies to the image synthesizer 21. The character video image signal is synthesized to the moving image video signal from the D/A converter 12 by the image synthesizer 21.

The operating section 15, a recording apparatus 16, and a printer 17 are connected to the system controller 7. The operating section 15 has not only a keyboard for designating a playing music piece but also a receiving section (not shown) for receiving the designation of the playing music piece from a remote control transmitter 23. The recording apparatus 16 is used to record the playing sound and singing sound of karaoke onto a recordable compact disc (not shown) such as a CD-R or the like. The audio signal comprising the playing sound and singing sound is supplied from the amplifier 18 to the recording apparatus 16. The printer 17 is used to print recording music piece information such as music title names or the like to a label which is designed so as to be adhered to a compact disc.

Figure 2:
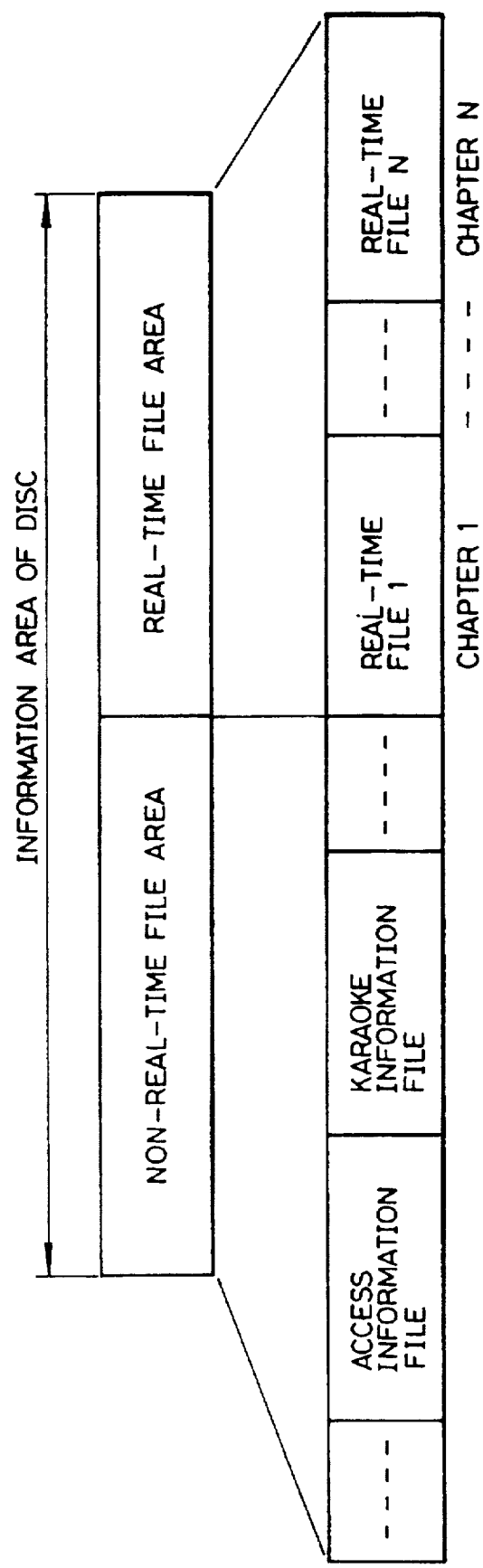
FIG. 2 is a diagram showing a construction of an information area of a disc.

The recording contents of the disc 5 which is played by the player section 4 will now be described. All information has been recorded as digital signals on the disc 5. As shown in FIG. 2, each information recording area of the disc 5 has a non-real-time file area and a real-time file area. An access information file such as a TOC or the like and a karaoke information file comprising the music title names or the like have been recorded in the non-real-time file area. N (N is an integer and corresponds to the number of music pieces) real-time files have been recorded in the real-time file area on the basis of, for example, MPEG (Moving Picture Expert Group) standard. Each real-time file is called a chapter unit. One chapter corresponds to one music piece. The real-time file of one chapter comprises: the compressed image data and compressed audio data of one music piece; and real-time data other than the image and audio sound. Those data are time-division multiplexed and recorded in the file.

Figure 3:
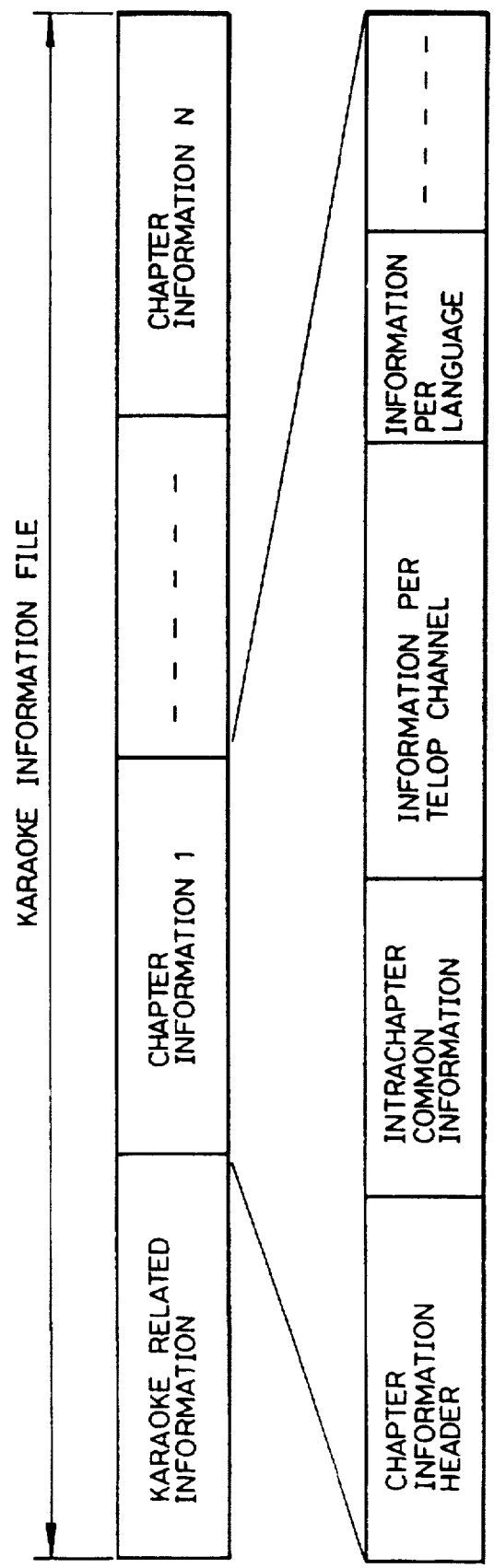
FIG. 3 is a diagram showing a construction of a karaoke information file.

The access information file comprises information indicative of the position and time duration in the disc of each chapter and the like. By referring to such information, an arbitrary chapter can be accessed. The karaoke information file comprises various kinds of information regarding the discs and music pieces. FIG. 3 shows a structure of the karaoke information file. The karaoke information file comprises disc related information and one or more chapter information. One chapter information is the related information of one chapter, namely, music piece. The number of chapter information coincides with the number of music pieces. The disc related information is the information regarding the whole disc and, for example, the information such as disc contents, identification of the disc itself, the number of music pieces recorded on the disc, and the like.

Each chapter information includes a chapter information header, common information in the chapter (also refers to as intrachapter common information), information per telop channel, and information per language. The chapter information header comprises ID information, information indicative of the contents, and the like of the chapter information. The intrachapter common information comprises: (1) a nationality of the music piece; (2) year, month, and day of the publication of the music piece; (3) a length of music piece; (4) a copyright code; (5) singer classification; (6) a genre of music piece; (7) a main theme image of music piece and a theme of music piece; (8) a situation of music piece; (9) a special genre of music piece; (10) a tempo of music piece; (11) a location image of music piece; (12) difficulty of music piece; (13) a multiaudio mode; (14) a background video image; (15) control apparatus information; (16) a DSP mode; and the like.

The information per telop channel is the information regarding the character information (telop) corresponding to the chapter. A plurality of character information series (telop channels) can be allocated to one chapter. For example, telops of a plurality of different languages which can be selected can be added to one chapter. The information per telop channel includes (1) the number of channels of the telop, (2) telop channel number, (3) a telop language, and (4) a character format of telop. A set of information of (2) telop channel number, (3) telop language, and (4) a character format of telop corresponds to one telop channel and as many sets of information as the number of telop channels are recorded.

The information per language is the information which depends on the language in the information about the chapter and comprises the following information: (1) the number of information per language; (2) a language code; (3) a description code system; (4) a size of information per language; (5) a music title name; (6) reading of the music title name; (7) a name of singer; (8) reading of the name of singer; (9) a name of songwriter; (10) reading of the name of songwriter; (11) a name of composer; (12) reading of the name of composer; (13) the first phrase; (14) reading of the first phrase; (15) location data; and the like. A set of information of (2) a language code to (15) location data corresponds to one language and as many sets of information as the number of information per language are recorded.

The operation of the above karaoke reproducing apparatus will now be described.

Figure 4:
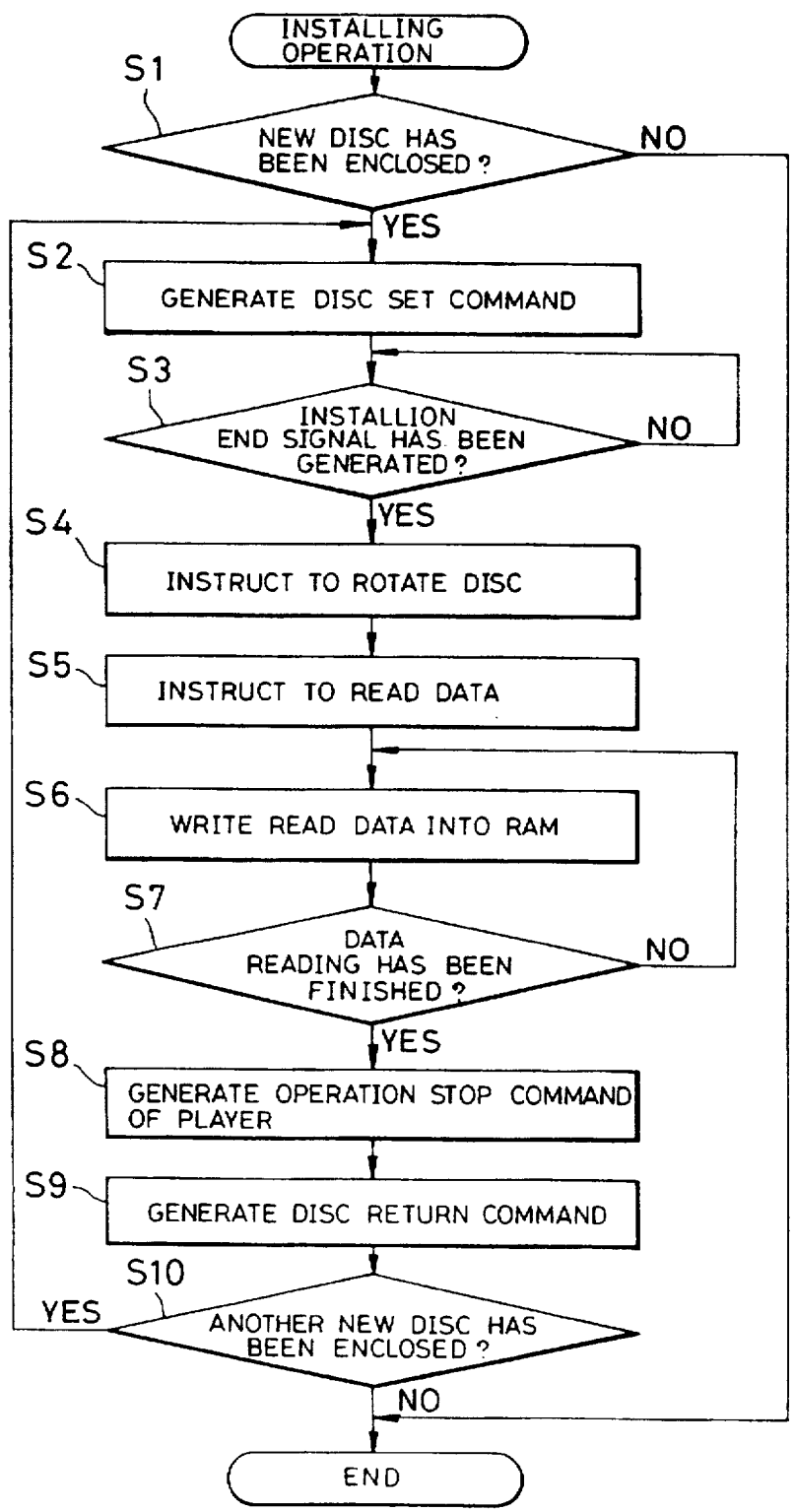
FIG. 4 is a flowchart showing the installing operation.

In the case of newly enclosing a disc into the disc enclosing section 2 of the automatic changer 1, the installing operation is first executed. In the installing operation, when the new disc is enclosed into the disc enclosing section 2 as shown in FIG. 4 and the system controller 7 detects such a state (step S1), the system controller 7 generates a disc set command to the disc conveying section 3 so as to load the disc onto the turntable of the player section 4 (step S2). When the disc conveying section 3 finishes to load the disc onto the turntable of the player section 4, information indicative of such a loading completion is supplied to the system controller 7 as a loading end signal. When the system controller 7, accordingly, obtains the loading end signal (step S3), the system controller 7 instructs the player section 4 to rotate the disc (step S4) and instructs to read the data (step S5). The player section 4 rotates the disc together with the turntable. After a rotational speed of the disc reached a predetermined speed, the data is read out from the non-real-time file area of the disc and is outputted.

The read-out data is supplied to the system controller 7 through the data separating circuit 6 and is once stored into a buffer memory (not shown) in the system controller 7. The system controller 7 sequentially writes the supplied data into the external RAM 13 (step S6) and discriminates whether the reading of the data by the player section 4 has been finished or not (step S7). For example, the data supplied by the execution of step S6 is written into the RAM 13 until a bit indicative of the end of data supply is supplied and the end of reading of the data is known. When the reading of the data is finished, an operation stop command is generated to the player section 4 (step S8) and a disc return command is generated to the disc conveying section 3 (step S9). The player section 4, therefore, stops the rotation of the turntable. After that, the disc conveying section 3 conveys the disc on the turntable to a predetermined enclosing position of the disc in the disc enclosing section 2 and encloses therein. After completion of the execution of step S9, the system controller 7 discriminates whether any other new disc has been enclosed or not (step S10). When another new disc is enclosed into the disc enclosing section 2, the processing routine advances to step S2. If no new disc is enclosed any more, the installing operation is finished.

All of the data of the access information file and the karaoke information file mentioned above can be also written as data to be written into the RAM 13. However, it is also possible to write only the music piece data such as at least only the disc number that is peculiar to the disc, address indicative of the enclosing position in the disc enclosing section 2 of the disc, location of each music piece in the disc, music title name, name of singer, name of songwriter, name of composer, length of music piece, copyright code, genre of music piece, tempo of music piece, difficulty of music piece, multiaudio mode, and the like.

The new disc can be enclosed by an input from the operating section 15 by the user. It is also possible to construct in a manner such that a sensor to detect the presence or absence of the disc is provided at each enclosing position in the disc enclosing section 2, an area to store the detection result is provided in the RAM 13, the detection outputs of all of the sensors are compared with the contents stored in the RAM 13 every installing operation, a discrimination about whether the new disc has been enclosed or not is made, and the result of the discrimination is written into the RAM 13.

In the above embodiment, the music piece data such as music title name and the like has been obtained when installing the disc on which the image data and the audio data of the music pieces have been recorded together with the music piece data. The music piece data, however, can be also derived from an exclusive-use disc on which only the music piece data such as music title name and the like has been recorded at the time of installing of the disc. Or, it is also possible to construct in a manner such that the music piece data of a plurality of discs on which the image data and audio data have been recorded is recorded onto one of those plurality of discs and those music piece data is derived when installing such one disc.

Figure 5:
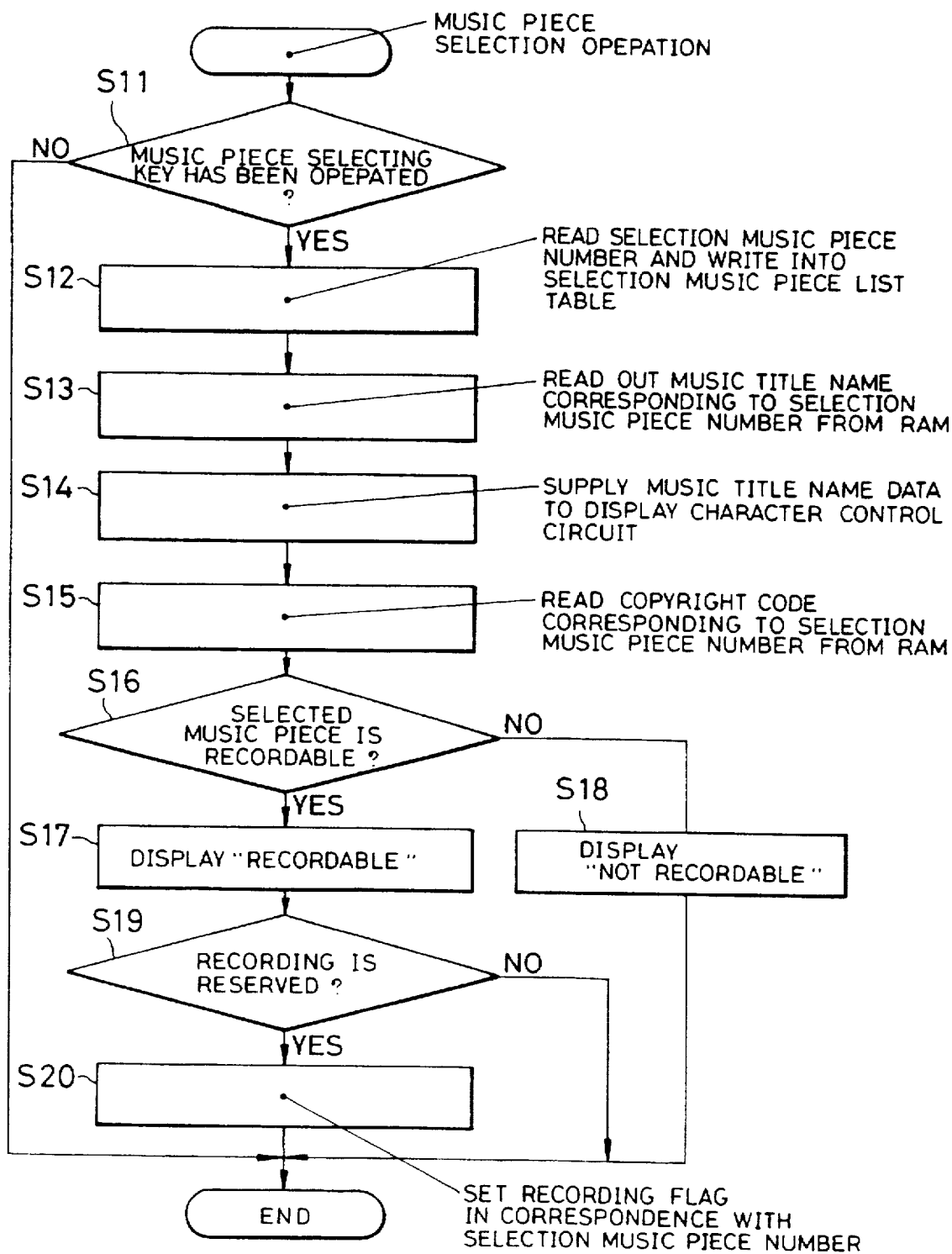
FIG. 5 is a flowchart showing the music piece selecting operation.

After the installing operation has been performed as mentioned above, the music piece selected by the user can be karaoke reproduced. In the music piece selecting operation, the user first inputs the music piece selection number by operating proper numerical keys or alphabetical keys of the operating section 15 or remote control transmitter 23. The music piece selection number is constructed by a plurality of digits and denotes the number to designate a desired disc and a desired one of music pieces recorded in the disc. When the key operation is performed, the music piece selection number is held in a buffer (not shown) in the operating section 15. As shown in FIG. 5, the system controller 7 discriminates whether a music piece selection key (not shown) of the operating section 15 has been operated at a predetermined timing or by an interrupting operation or not (step S11). When the music piece selection key is operated, the music piece selection number is read out from the above buffer and is written into a music piece selection list table in the RAM 13 (step S12). The music piece selection list table is formed in the RAM 13 and music piece selection numbers and recording flags (which will be explained later) are written in accordance with the playing order as shown in FIG. 6. When the playing is finished, the order is advanced. The music piece name corresponding to the read music piece selection number is read out as information data from the RAM 13 (step S13). The read-out data is supplied to the display character control circuit 20 (step S14). The display character control circuit 20 produces the display character data indicative of the music title name and writes into a predetermined position in the V-RAM. After the display character data has been read out from the V-RAM and converted into the character video image signal, it is supplied to the image synthesizer 21. The character video image signal is outputted from the image synthesizer 21 in place of the moving image video signal from the D/A converter 12 in the case of the signal indicative of a predetermined color, so that it is synthesized to the moving image video signal. The music title name is, therefore, displayed as a character video image by the display 22 and it is confirmed that the music piece selected by the key operation has been accepted.

After completion of the execution in step S14, the system controller 7 reads out the copyright code corresponding to the read music piece selection number from the RAM 13 (step S15). Since the copyright code exists in the data which has been read out from the disc and written in the RAM 13 at the time of the installing operation, the copyright code can be read out from the RAM 13. The copyright code is a code indicative of the owner of the copyright of the music piece. On the basis of the copyright code which has been read out, a check is made to see if the selected music piece is a recordable music piece or not (step S16). As shown in FIG. 7, the copyright code, copyright owner, and information indicating whether the recording of the music piece is permitted or inhibited have previously been written as a recording permission/inhibition data table in an ROM (read only memory) 14 provided in the outside of the system controller 7. As for the permission and inhibition of the recording, "1" indicates that the recording is permitted and "0" indicates that the recording is inhibited. A check is, therefore, made to see if the selected music piece is a music piece which can be recorded or not from the recording permission/inhibition data table. If the recording can be performed, a message indicating that the recording can be performed is displayed (step S17). If the recording cannot be performed, a message indicating that the recording cannot be executed is displayed (step S18). Such messages can be displayed by the display 22 or can be also displayed by a display (not shown) which is provided for the apparatus and in order to display whether the recording is permitted or inhibited. In the case of displaying the message by the display 22, display character data indicating whether the recording can be performed or is inhibited is produced by the display character control circuit 20 in accordance with a command from the system controller 7 and is written into the V-RAM.

After completion of the execution in step S17 because the recording can be performed, the system controller 7 judges whether there is a recording reservation or not (step S19) by checking whether a recording reservation key of the operating section 15 or the remote control transmitter 23 has been operated or not. When there is a recording reservation, the recording flag in the music piece selection list table is set (step S20). Since "0" indicative of the non-recording has previously been written as an initial value of the recording flag in the music piece selection list table, when the recording reservation key is operated, the recording flag is set into "1" indicative of the recording in correspondence to the music piece selection number.

Figure 8:
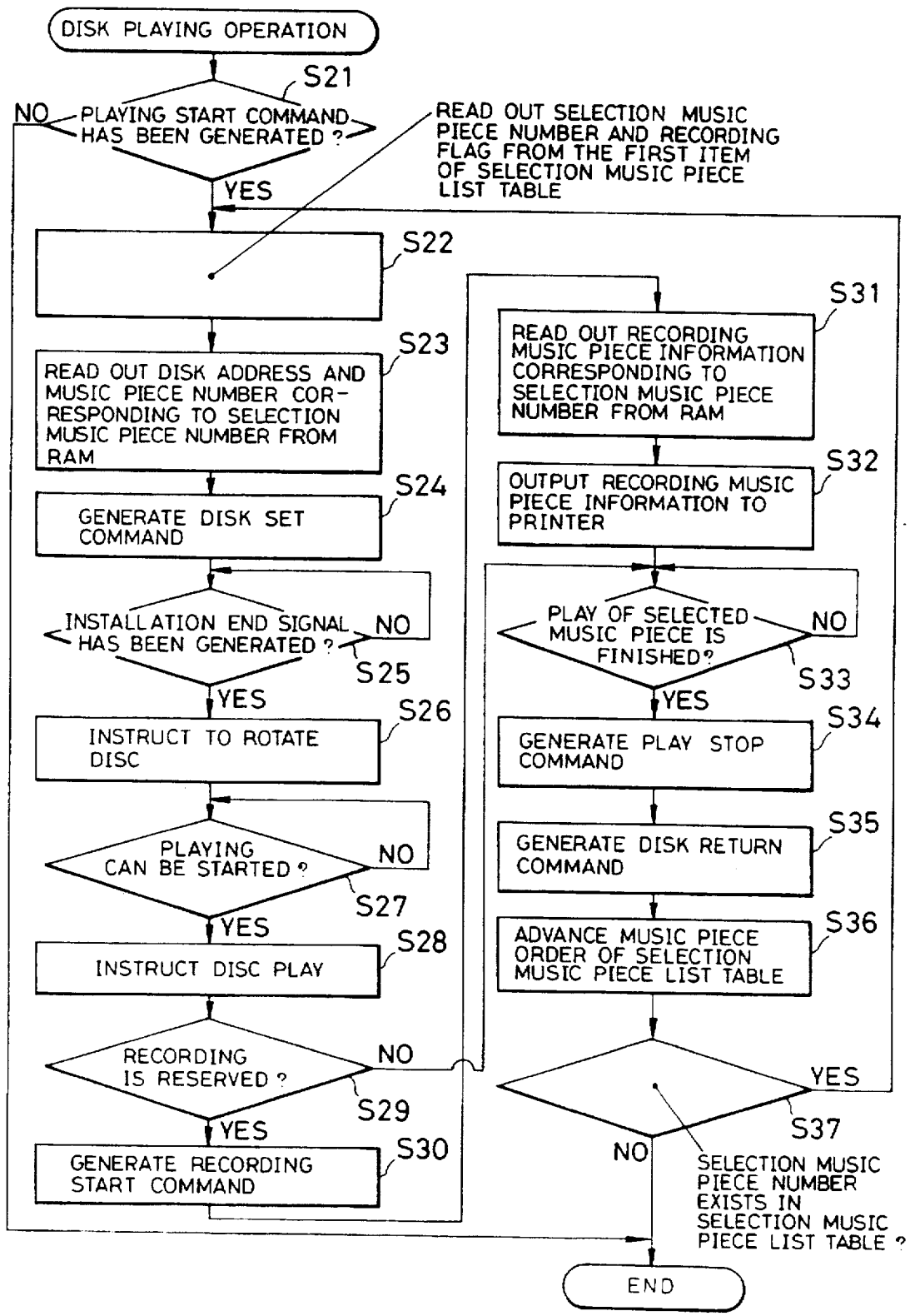
FIG. 8 is a flowchart showing the disc playing operation.

The disc playing operation will now be described. As shown in FIG. 8, when the start of the playing is first instructed by a key operation of the operating section 15 (step S21), the system controller 7 sequentially reads out the music piece selection numbers and recording flags in accordance with the playing order from the first order in the music piece selection list table formed in the RAM 13 (step S22). The disc address, music piece number and its location in the disc corresponding to the read-out music piece selection number are read out from the RAM 13 (step S23). A disc set command is generated to the disc conveying section 3 in order to load the disc in the read-out disc address onto the turntable of the player section 4 (step S24). When the disc conveying section 3 finishes to load the disc onto the turntable of the player section 4, information indicative of such a loading completion is supplied as loading end signal to the system controller 7. When obtaining the loading end signal (step S25), therefore, the system controller 7 instructs the rotation of the disc to the player section 4 (step S26). A check is made to see if the disc playing can be started or not (step S27). For instance, in the case where the playing is inhibited by a key operation of the operating section 15, the disc playing is not started. In the case where the disc playing can be started, the disc playing is instructed from the track of the read-out music piece number (step S28). The player section 4, accordingly, starts to play the music piece designated by the music piece selection number and the reproduced video image signal and audio signal are supplied to the display 22 and the speaker 19. Whether there is a recording reservation or not is discriminated from the recording flag which has been read out (step S29). When the recording flag is set to "1", a recording start command is generated to the recording apparatus 16 (step S30). Since the audio signal including the singing sound is supplied from the amplifier 18 to the recording apparatus 16, it is recorded to a compact disc in response to the recording start command.

After step S30 has been executed, the system controller 7 reads out the recording music piece information corresponding to the music piece selection number which has been read out in step S22 from the RAM 13 (step S31). The recording music piece information includes at least the music title name, songwriter name, and composer name. Information such as singer name, recording day and time, location, and the like can be also added to the recording music piece information. After those recording music piece information has been read out, it is supplied to the printer 17 (step S32). The printer 17 prints the recording music piece information to a label which is designed so as to be adhered to the compact disc. By adhering the label to the label surface of the compact disc recorded, it becomes the record about the recorded music piece. It will be obviously understood that the recording music piece information can be also directly printed to the label surface of the compact disc instead of the label.

After step S32 has been executed, the system controller 7 judges whether the playing of the selected music piece has been finished or not (step S33) by checking the time information in the control data which is supplied from the data separating circuit 6 by the playing of the disc. After completion of the playing of the selected music piece, a playing stop command is generated to the player section 4 (step S34) and a disc return command is generated to the disc conveying section 3 (step S35). The player section 4, therefore, stops the disc playing operation. After the rotation of the turntable has been stopped, the disc conveying section 3 conveys the disc on the turntable to a enclosing position where the disc was in the disc enclosing section 2 and encloses the disc therein. After the disc return command has been generated, the system controller 7 advances the music piece order in the selection music piece list table by one music piece (step S36). A check is made to see if the music piece selection number has been recorded at the first position in the selection music piece list table or not (step S37). If the music piece selection number has been recorded, the processing routine is returned to step S22 and the above operation is repeated. On the other hand, when no music piece selection number is recorded, the playing operation is finished.

Figure 9:
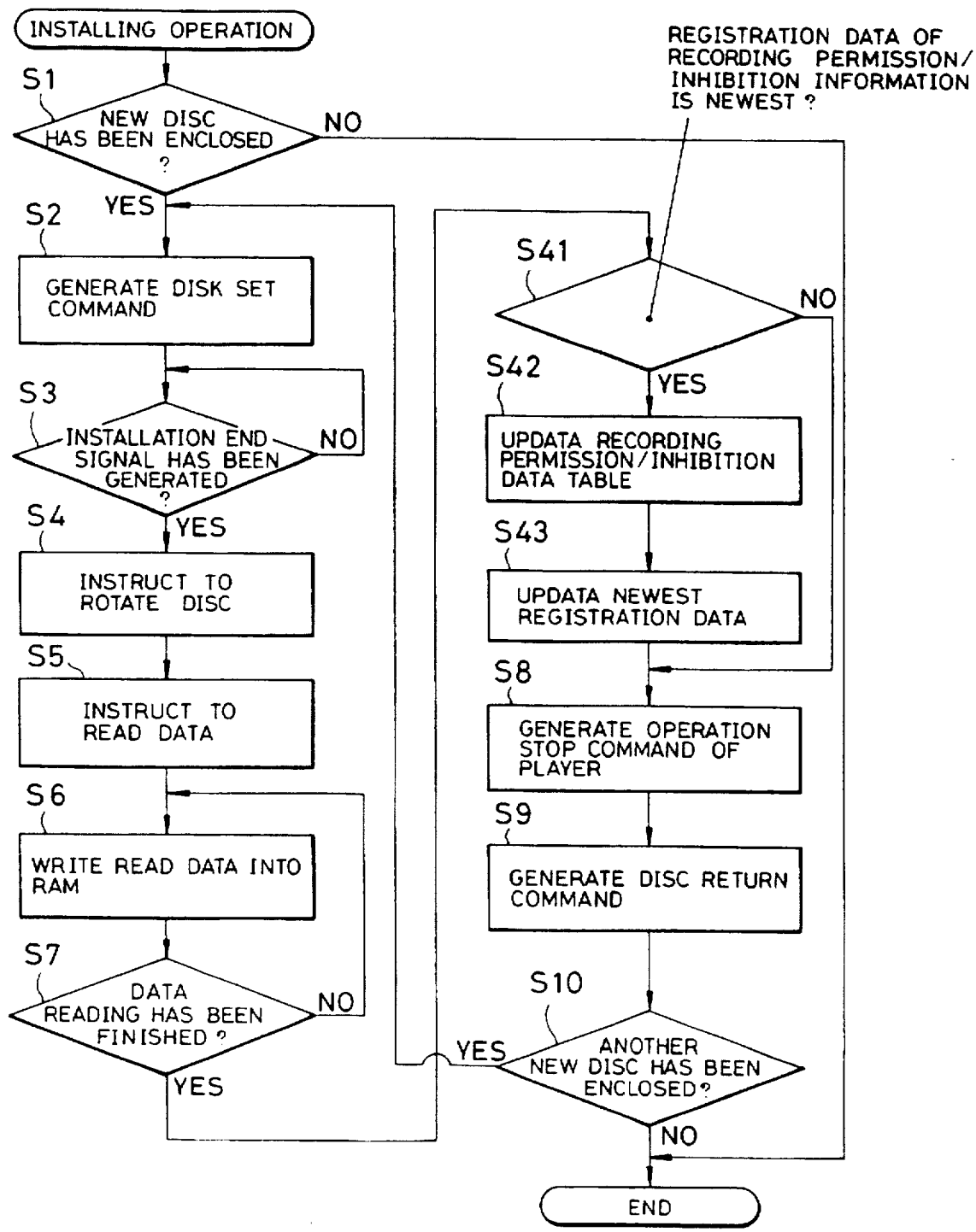
FIG. 9 is a flowchart showing an example of another installing operation.

FIG. 9 shows another procedure of the installing operation. In the installing operation of FIG. 9 which relates to a case where in addition to the copyright code, the information such as copyright owner, recording permission/inhibition information, and date of registration of the recording permission/inhibition information is recorded on the disc. A recording permission/inhibition data table shown in FIG. 7 is formed in the RAM 13 instead of the ROM 14. That is, as shown in FIG. 9, steps S1 to S7 are similar to the installing operation shown in FIG. 4 and the read-out data is written into the RAM 13 through the system controller 7. In the writing operation, the copyright owner and the recording permission/inhibition data are not written into the recording permission/inhibition data table but are merely written into RAM 13 as data of each disc or music piece. After completion of the reading of the data, a check is made to see if the recording permission/inhibition information registration date which has been read out from the disc is the newest date or not (step S41). If the recording permission/inhibition information registration date is not later than the latest registration date stored in the RAM 13, step S8 follows and the operation of the player section 4 is stopped. On the other hand, when the recording permission/inhibition information registration date is later than the latest registration date, the recording permission/inhibition data table is updated by the various information of the copyright owner and the recording permission/inhibition which were read out (step S42). Further, the updating registration date is updated by the read-out recording permission/inhibition information registration date (step S43). After step S43 has been executed, step S8 follows. Steps S8 to S10 are similar to the installing operation shown in FIG. 4.

It is also possible to construct in a manner such that the service person for maintenance, inspection, and the like of the karaoke reproducing apparatus can change the copyright owner and recording permission/inhibition data of the recording permission/inhibition data table by a special key operation of the operating section 15.

It will be obviously understood that the recording medium on which at least karaoke playing sounds of a plurality of music pieces have been recorded is not limited to the disc but another recording medium such as a tape or the like can be also used.

In the karaoke reproducing apparatus according to the first feature of the present invention as mentioned above, the memory in which the music title name information of each of the music pieces recorded on the recording medium has previously been stored is provided and, when one of the plurality of music pieces is selected by the operation, the music title name information of the selected music piece can be immediately displayed by characters. The user who performed the music piece selecting operation, consequently, can soon confirm whether a desired music piece has correctly been accepted to the apparatus or not at the operation time point. Particularly, the above construction is effective because it is possible to know that the apparatus has been correctly remote controlled in the case where the music piece selecting operation had been executed by using the remote control transmitter.

The second embodiment of the invention will now be described. The embodiment also has the construction and operation shown and described in FIGS. 1 to 8 and their descriptions are omitted here. In the case of the second embodiment, the data supplied to the system controller 7 is written into the RAM 13 and a data table is formed in step S6 shown in FIG. 4. As data which is written into the RAM 13, all of the data of the foregoing access information file and karaoke information file can be used. In correspondence to the music piece code of each music piece, it is also possible to write only the music piece data such as at least disc number that is peculiar to the disc, address indicative of the storing position in the disc enclosing section 2 of the disc, location in the disc of the music piece, music title name, singer name, songwriter name, composer name, length of music piece, copyright code, genre of music piece, main theme image of music piece, music piece theme, situation of music piece, special genre of music piece, and the like.

In the second embodiment, in the case where the user cannot know the name of the music title which he wants to sing or where he wants to sing the music piece according to his feeling or an atmosphere or the like, the music piece selecting operation is not executed but a search key (not shown) of the operating section 15 is operated. When such a search key is operated, the system controller 7 starts the music title name searching operation.

Figure 10:
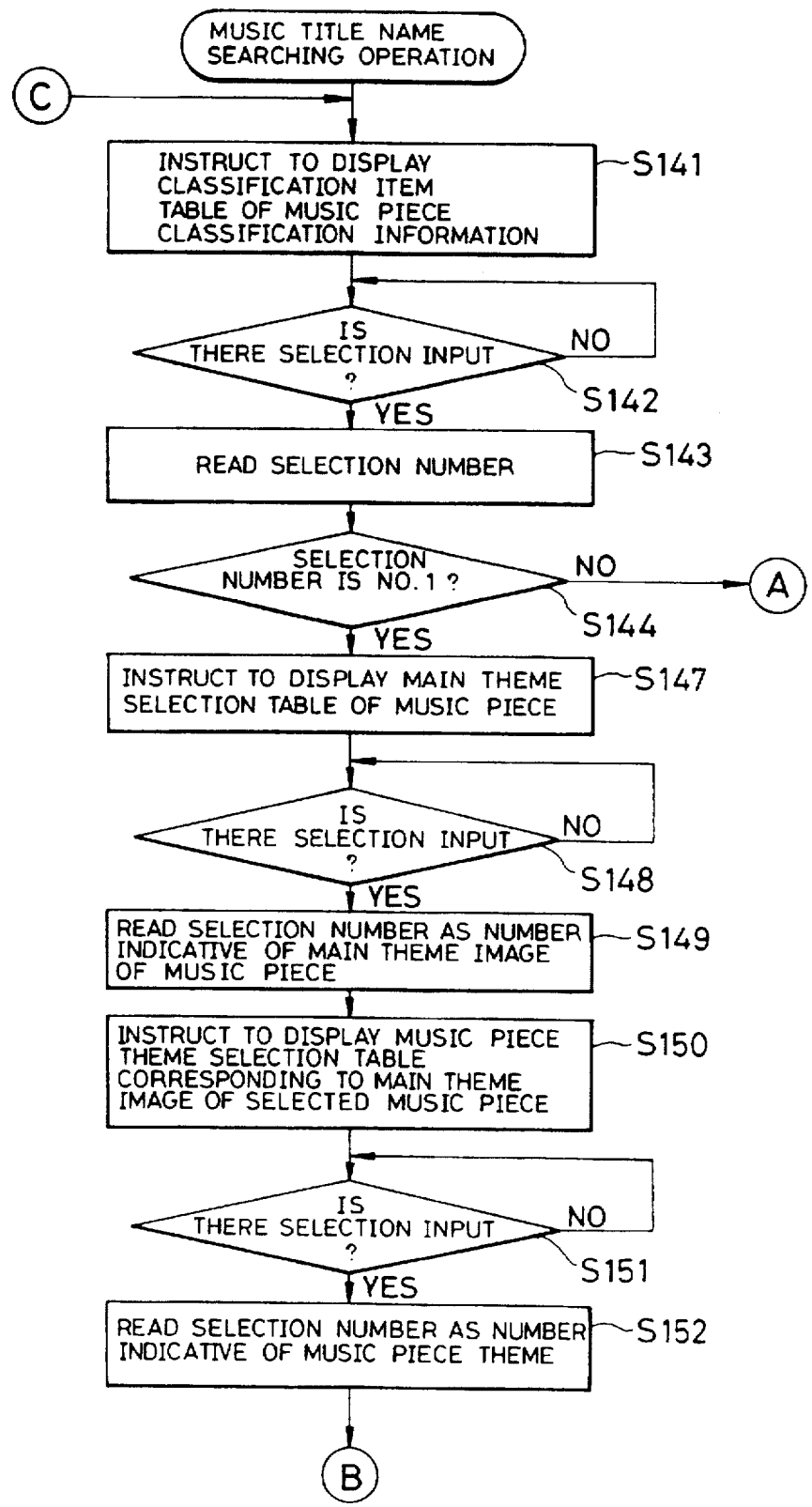
FIG. 10 is a flowchart showing the music title name searching operation.
Figure 11:
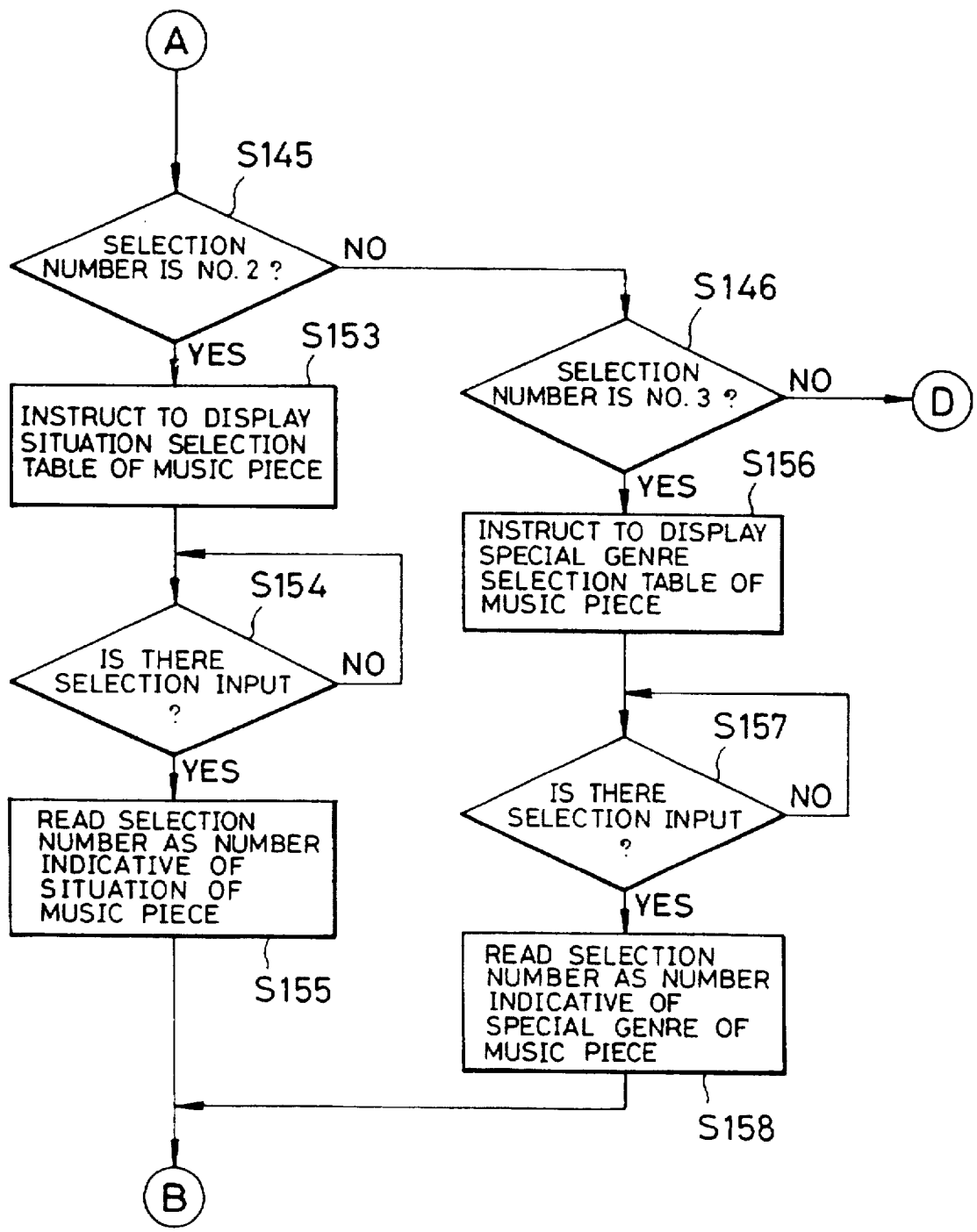
FIG. 11 is a flowchart showing a continuing portion of the music title name searching operation in FIG. 10.
Figure 12:
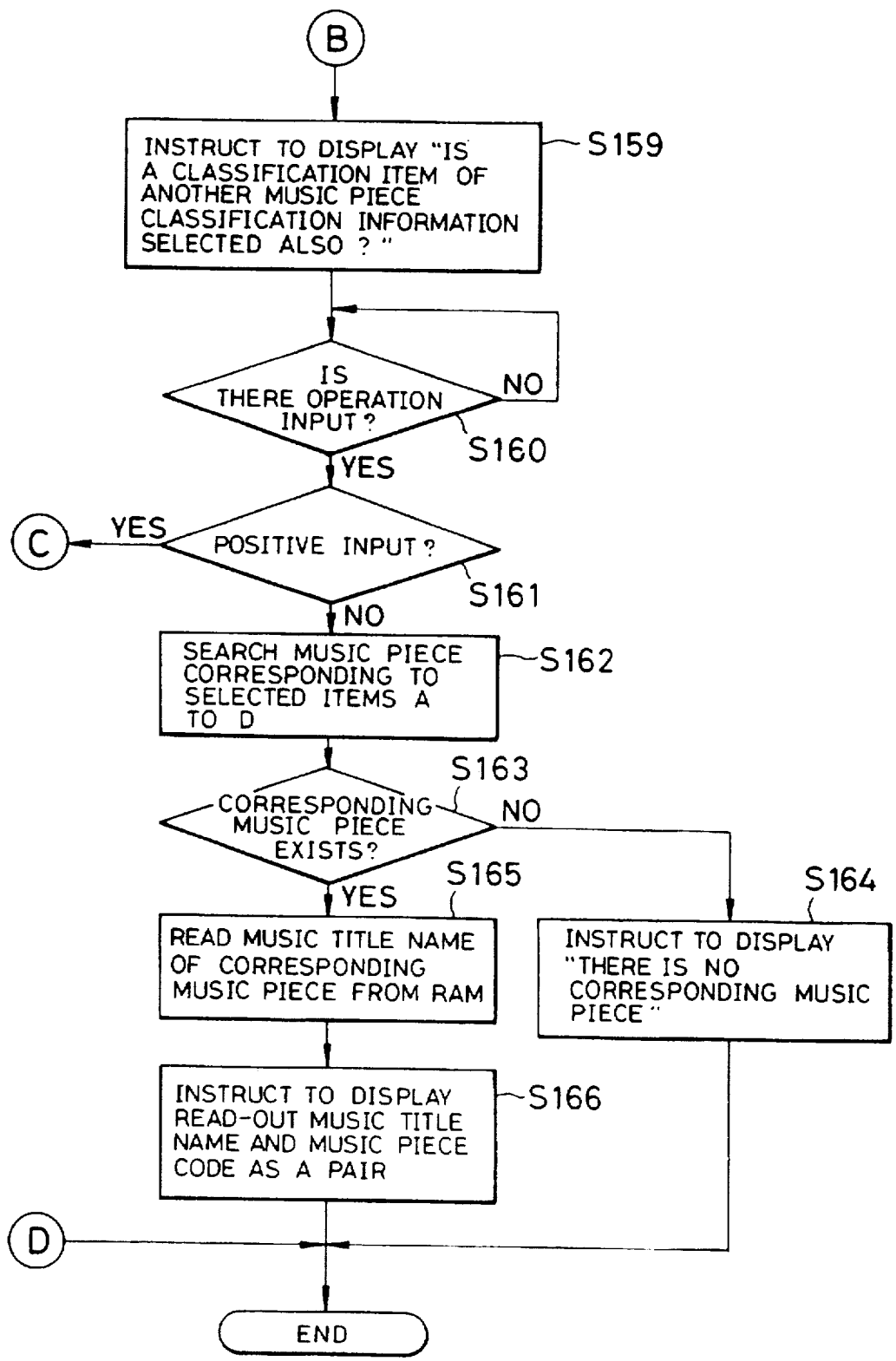
FIG. 12 is a flowchart showing a continuing portion of the music title name searching operation in FIG. 10.

In the music title name searching operation, as shown in FIGS. 10 to 12, the system controller 7 first instructs the display character control circuit 20 to display a classification item table of the music piece classification information which is used for search (step S141). In the example, the classification items of the music piece classification information include: a main theme image, a music piece theme of the music piece, situation of the music piece, and special genre of the music piece included in the intrachapter common information. By supplying a list table of those classification items as data to the display character control circuit 20, a display command is executed. Such list table data can be also provided in a program for the music title name searching operation. The display character control circuit 20 produces the display character data indicative of the classification item table and writes to a predetermined position in the V-RAM. After the display character data has been read out from the V-RAM and converted into the character video image signal, it is supplied to the display 22 through the image synthesizer 21. Therefore, the classification items of the music piece classification information are displayed on the screen of the display 22 as a character image as shown in, for example, FIG. 13. It is also possible to construct in a manner such that the image synthesizer 21 can switch between the display of the synthesized image and the display of only the characters and only the characters are displayed in the searching operation.

The music piece classification information is such information as intrachapter common information which comprises the items in a wide range such as nationality and year and date of the music piece, permission or inhibition of the recording, feasibility of the duet, and feasibility of the automatic control of an external apparatus such as an illumination or the like in addition to the information depending on the contents of the words of music piece. Every item doesn't depend on the language and the music piece can be allocated to either one of a plurality of selection branches existing in the items. A predetermined number of bits are allocated to each item, therefore, each selection branch in the item is encoded by the bit number and the code of the selection branch which has been allocated is added to each music piece. As mentioned above, the music piece classification information is distinguished from the singer name, songwriter name, and composer name which are described by the characters in dependence on the language.

The system controller 7 judges whether there is a selection input from the operating section 15 or not (step S142). Such a selection input is performed by numerical keys. When the numerical keys are operated, the selection number as one-byte data is held in the above buffer in the operating section 15. When there is the selection number newly held in the buffer, the system controller 7 reads the selection number (step S143) and discriminates whether the read selection number is equal to "1" or not, namely, it indicates the main theme image and music piece theme of the music piece or not (step S144). When the read selection number doesn't indicate "1", a check is made to see if the selection number is equal to "2", or not, namely, it indicates the situation of music piece or not (step S145). When the read selection number is not equal to "2", a check is made to see if the read selection number is equal to "3" or not, namely, it indicates the special genre of music piece or not (step S146).

In step S144, when it is judged that the selection number indicative of the main theme image and music piece theme of the music piece has been read, the display of a main theme image selection table of the music piece is instructed to the display character control circuit 20 (step S147). The main theme image of the music piece comprises three selection branches of love, life, and others as shown in FIG. 14. By supplying a list table of those selection branches as data to the display character control circuit 20, the display command is executed. A main theme image selection table of the music piece is displayed as a character video image on the display 22 by an operation similar to the display of the classification item table of the music piece classification information mentioned above.

After the display of the main theme image selection table of the music piece has been instructed, the system controller 7 judges whether there is a selection input from the operating section 15 or not (step S148). When the key operation is performed, the selection number as one-byte data is held in the buffer in the operating section 15. When there is a selection number which has been newly held in the buffer in the operating section 15, the system controller 7 reads out the selection number as a main theme image A of the music piece (step S149). After that, the display of the music piece theme selection table according to the main theme image A of the music piece is instructed to the display character control circuit 20 (step S150). When the main theme image A of the music piece relates to the code indicative of love, consequently, the first music piece theme selection table is displayed. When it indicates life, the second music piece theme selection table is displayed. When it indicates others, the third music piece theme selection table is displayed. FIG. 15 shows the contents of each music piece theme, namely, selection branches.

After the display of the music piece theme selection table has been instructed, the system controller 7 discriminates whether there is a selection input from the operating section 15 or not (step S151). The selection input is similarly executed by numerical keys. When the key operation is executed, the selection number is held in the buffer in the operating section 15. When there is a selection number which has been newly held in the buffer, the system controller 7 reads the selection number as a music piece theme B (step S152). Two-byte data AB, therefore, corresponding to the contents of the main theme image and music piece theme of the music piece is derived.

In the case where it is judged in step S145 that the selection number indicative of the situation of music piece has been read, the display of a situation selection table of the music piece is instructed to the display character control circuit 20 (step S153). The situation of the music piece comprises selection branches such as Christmas, birthday, valentine's day, and the like as shown in FIG. 16. By supplying a list table of those selection branches as data to the display character control circuit 20, the display command is executed. The situation selection table of the music piece, therefore, is displayed as a character video image on the display 22. After the display of the situation selection table of the music piece has been instructed, the system controller 7 judges whether there is a selection input from the operating section 15 or not (step S154). When there is a selection number which has been newly held in the buffer in the operating section 15, the system controller 7 reads the selection number as a situation C of the music piece (step S155).

When it is judged in step S146 that the selection number indicative of the special genre of the music piece has been read, the display of a special genre selection table of music pieces is instructed to the display character control circuit 20 (step S156). As shown in FIG. 17, the special genre of music pieces comprises selection branches such as CM song, TV drama main theme song, other theme song, and the like. By supplying a list table of those selection branches as data to the display character control circuit 20, the display command is executed. The special genre selection table of music pieces is displayed as a character video image onto the display 22. After the display of the special genre selection table of music pieces has been instructed, the system controller 7 checks whether there is a selection input from the operating section 15 or not (step S157). When there is a selection number which has been newly held in the buffer in the operating section 15, the system controller 7 reads the selection number as a special genre D of the music piece (step S158).

After either one of steps S152, S155, and S158 has been executed, the system controller 7 instructs the display character control circuit 20 to display the characters of "Is a classification item of another music piece classification information selected also?" (step S159). In response to such an instruction, the above characters are displayed on the display 22, so that the user responds by a key operation of the operating section 15, for example, Y (yes) or N (no) of the alphabetical key. The system controller 7, accordingly, judges whether there is an input from the operating section 15 or not (step S160). When there is an input from the operating section 15, a check is made to see if the input is affirmative or not (step S161). When the input from the operating section 15 is affirmative, the processing routine is returned to step S141 and the above operation is repeated. On the other hand, when the input is negative, the processing routine advances to the next step S162. The numbers A to D corresponding to the classification items of the music piece classification information which are not selected are shown by the initial value "0" as they are.

In step S162, the system controller 7 searches for the music pieces corresponding to the main theme image A and the music piece theme B of the music piece and to the situation C and special genre D of the music piece from the RAM 13. That is, since the main theme image and the music piece theme of the music piece and the situation and special genre of the music piece have been encoded and written in the RAM 13 every music piece by the installing operation, they are sequentially read out in accordance with a predetermined music piece order. The music pieces such that the main theme image and music piece theme of the music piece are equal to A and B and the situation of the music piece is equal to C and the special genre of the music piece is equal to D are compared and searched for. When there are music pieces in which those data coincide with respect to all items, the codes of such music piece are stored into a memory (not shown) in the system controller 7. The classification items in which the selection number is equal to 0 are ignored. After completion of the searching operation in step S162, a check is made to see if the relevant music pieces exist or not (step S163). As a result of the search, when no music piece code is stored in the system controller 7, the display of the characters of "There is no corresponding music piece." is instructed to the display character control circuit 20 (step S164). On the other hand, when at least one music piece code is stored in the system controller 7, the music title names corresponding to all of the music piece codes stored, namely, the music title names of the corresponding music pieces are read out from the RAM 13 (step S165). Both of the read-out music title names and the music piece codes are supplied as a pair data to the display character control circuit 20 (step S166). Therefore, the display character data indicative of the music piece code and the music title name is produced in the display character control circuit 20 and written at a predetermined position in the V-RAM. The display character data is read out from the V-RAM and converted into the character video image signal. After that, the character video image signal is supplied to the display 22 through the image synthesizer 21. At least one music piece code and its music title name obtained by the search are displayed on the display 22 as a character video image. The display of each table for search and the display of the music piece code and its music title name of the result of the search can be also executed by another display different from the display 22.

When the user operates a music piece selection key (not shown) of the operating section 15 after the music title name searching operation has been finished as mentioned above, the system controller 7 starts the music piece selecting operation in a manner similar to the operation mentioned above. The user selects a desired music piece from the music title names displayed on the display 22 by using its music piece code as a music piece selection number. Or, when displaying, it is also possible to allocate the number to each searching music piece and to select a desired music piece on the basis of such a number.

Figure 18:
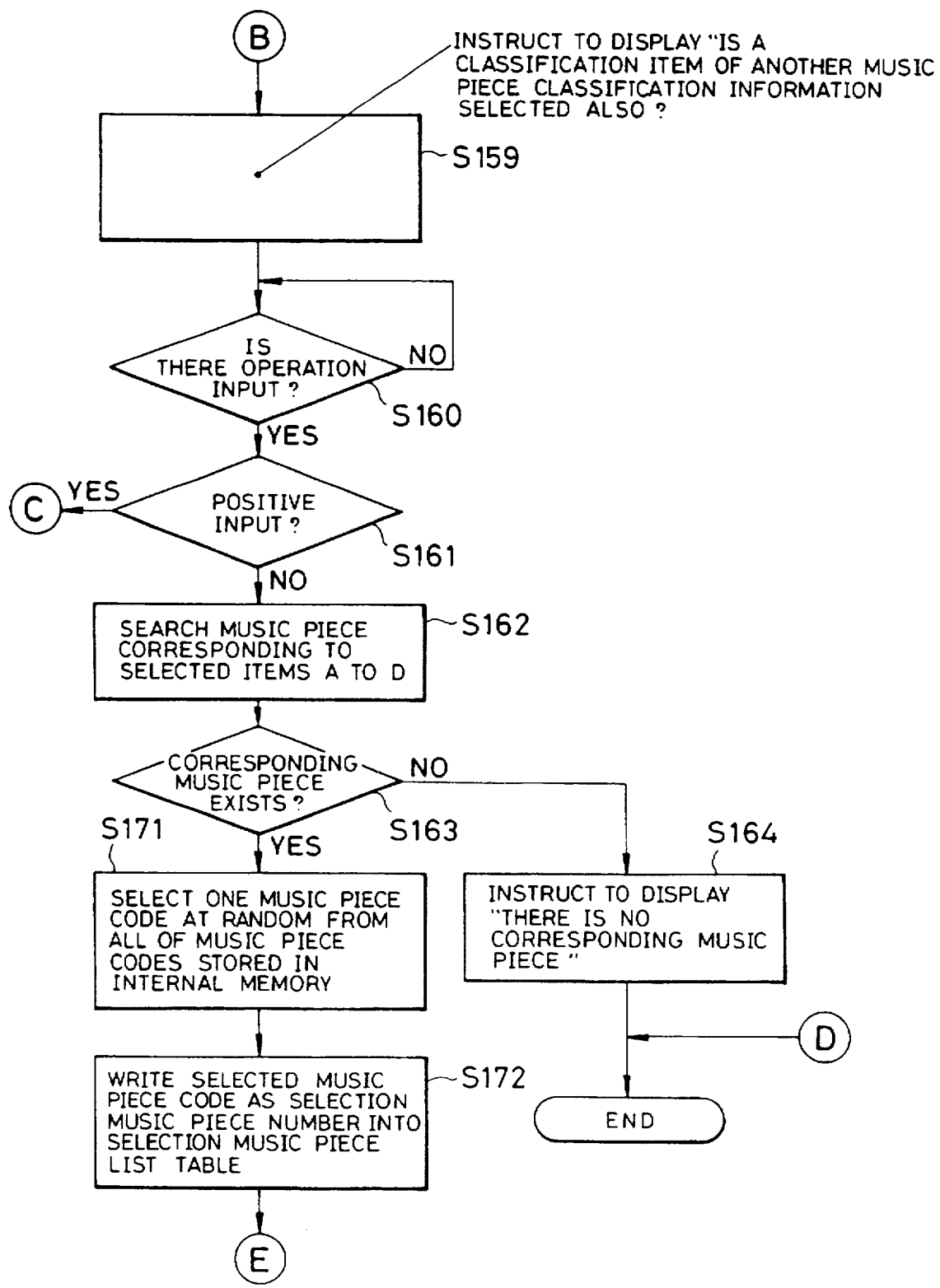
FIG. 18 is a flowchart showing another example of the music title name searching operation.

In the above music title name searching operation, although the user finally selects a desired music piece from the music title names displayed on the display 22, a desired music piece can be also automatically selected on the karaoke reproducing apparatus side. In this case, as shown in FIG. 18, when corresponding music piece exists in step S163, and it is judged that even at least one music piece code has been stored in the memory in the system controller 7, the system controller 7 selects at random one of all of the music piece codes stored in the internal memory (step S171). The selected music piece code is written as a music piece selection number into a selection music piece list table in the RAM 13 (step S172). After that, the processing routine forcibly advances to step S113 for the above music piece selecting operation. The music title name corresponding to the music piece selection number is read out as information data from the RAM 13. In step S114, further, the read-out data is supplied to the display character control circuit 20. The music title name as a result of the automatic music piece selection is, consequently, displayed on the display 22, so that the user can confirm the music piece to be sung.

As another method of searching by a combination of a plurality of items shown in the above embodiment, there is also a method such that a plurality of sets each comprising the contents selected from the selection branches of each of a plurality of items are prepared and the person who wants to select a music piece selects a desired set. For example, as shown in FIG. 19, combinations of the contents which are frequently selected are displayed as sets and the person who wants to select desired music pieces selects a proper set by the number. With this method, the corresponding music pieces can be searched for by a smaller number of operating procedures.

As further another method of searching by a combination of a plurality of items, there is a method such that selection branches by a classification different from the information regarding the music pieces recorded in the karaoke information file are presented and the contents of the selected branch are searched for in correspondence to the information regarding the music pieces. For example, selection branches as shown in FIG. 20 are presented and when "Wooing song before 1970s" is selected, the system controller 7 searches for the corresponding music piece by using "(2) Year, month, and day of publication of the music piece" and "Declaration of love (man—woman)" of "Love" in "(7) a main theme image of music piece and a theme of music piece" in the intrachapter common information in the information regarding the music piece. By directly setting the request contents of the person who wants to select the music piece into the selection branches, as stated above, the music piece which meets the requirements can be more easily searched for.

By using "(15) Control device information" of the intrachapter common information, the music piece can be searched for by the function. FIG. 21 relates to an example of "(15) Control device information" and shows that one bit corresponds to one external apparatus and, when the value of the bit is equal to "1", the external apparatus corresponding to the bit can be controlled. For example, when searching under a condition such that the music piece in which the illumination control can be performed is searched for, therefore, the system controller 7 searches for the music piece in which the bit 15 is equal to "1" and displays on the display 22 through the display character control circuit 20. In this manner, the person who wants to select a music piece can select a desired music piece from the music pieces in which the target function can be realized.

In the above example, the intrachapter common information has been used as information that is used to search, however, other information such as singer name, songwriter name, composer name, and the like can be also used solely or as a combination with the intrachapter common information for search.

By using "(4) Copyright code" of the intrachapter common information, the music pieces, which satisfy the condition such that the music piece can be recorded, can be searched for and it is possible to easily meet the requirement of the user such that he wants to sing the recordable music piece.

By using "(5) Singer classification" of the intrachapter common information, the music pieces which can satisfy the condition such that the music piece can be sung in duet can be searched for. The user who wants to sing in duet can easily select a desired music piece from the duet music pieces.

When the music piece has four audio channels, the contents of the two audio subchannels among four channels can be known with reference to "(13) Multiaudio mode" of the intrachapter common information, so that the music piece can be searched for on the basis of the contents of the subchannels. For example, in the case where (karaoke accompaniment)+(vocal of one of the duet) have been recorded in one of the audio subchannels and (karaoke accompaniment)+(vocal of another one of the duet) have been recorded in the other channel, the user selects the reproduction of either one of the audio subchannels, so that he can perform the duet by the recorded vocal sound and the user. By using "(13) Multiaudio mode" as a classification item, the music piece which satisfies the condition such that the music piece can be sung in duet even by one person can be easily searched for.

In the present invention, the recording medium on which at least the karaoke playing sounds of a plurality of music pieces have been recorded is not limited to the disc but it will be obviously understood that another recording medium such as a tape or the like can be also used.

In the karaoke reproducing apparatus according to the second feature of the invention as mentioned above, the apparatus has the memory means in which the music piece classification information of each of the music pieces recorded on the recording medium has previously been stored. An item content selection command to designate the contents of at least one of a plurality of different items included in the music piece classification information is generated in accordance with the operation. The music piece corresponding to the contents of at least one item indicated by the item content selection command is searched for through the memory means. That is, in the case where the user doesn't know the music piece information such as music title name, singer name, or the like of the music piece which he wants to sing, or in the case where the user wants to sing the music piece according to the feeling or atmosphere in that moment, the user can search for a desired music piece. The user, therefore, can enjoy the karaoke in accordance with the result of the search.

The third embodiment of the invention will now be described. In the embodiment, a karaoke reproducing apparatus has a construction shown in FIG. 22. The portions in a range from the automatic changer 1 to the remote control transmitter 23 are substantially the same as the corresponding portions in the construction shown in FIG. 1 and their descriptions are omitted here. In the third embodiment, terminals to connect external apparatuses are provided for the data separating circuit 6. In the apparatus, an illuminating apparatus 25, a background video image apparatus 26 including a video camera and a recording medium playing apparatus, and an audio processing apparatus 27 comprising a DSP (Digital Signal Processor) are provided as external apparatuses and they are apparatuses for karaoke presentation. The illuminating apparatus 25 is used to control the illumination in what is called a karaoke room. The background video image apparatus 26 is used to display, for example, a video image according to the image, situation, location, or season of the music piece by the playing operation of the recording medium playing apparatus in addition to a photographing video image such as a singer or the like using a video camera as a background video image of the character information such as song words or the like which are displayed on the display 22. The background video image apparatus 26 generates a background video image signal indicative of the background video image. The audio processing apparatus 27 is used to control a sound field of the karaoke sound or singing sound in the karaoke room and is arranged in the audio reproducing system as will be explained later. The illuminating apparatus 25, background video image apparatus 26, and audio processing apparatus 27 are also connected to the system controller 7.

In a manner similar to FIG. 1, the display character control circuit 20 has a character generator and a V-RAM and produces the display character data according to information data and writes it into the V-RAM. The control circuit 20 reads out the display character data from the V-RAM synchronously with a sync signal of the above moving image video signal and converts into the character video signal and supplies to the image synthesizer 21. The character video image signal is synthesized to the moving image video signal from the D/A converter 12 or the background video image signal from the background video image apparatus 26 by the image synthesizer 21.

The recording contents of the disc which is played by the player section 4 in the embodiment are as shown in FIG. 2. The real-time data in the real-time file is used to control the external apparatuses. The real-time data shows, for example, a climax degree of the music piece by 16 levels and its start time and duration are shown by a time unit (for example, on a frame unit basis). The real-time data can be also provided by the contents which differ every external apparatus which can be connected.

An access information file has contents shown in FIG. 3 in a manner similar to the cases of the first and second embodiments. The karaoke reproducing apparatus, further, executes the operations shown in FIGS. 4 to 7.

As data which is written into the RAM 13 in step S6 in FIG. 4, the information of enclosing of a new disc can be obtained by the input from the operating section 15 by the user. It is also possible to construct in a manner such that a sensor to detect the presence or absence of the disc is attached at each enclosing position of the disc enclosing section 2, a region to store the results of the detection is provided in the RAM 13, the detection outputs of all of the sensors are compared with the contents stored in the RAM 13 every installing operation to thereby discriminate whether the new disc has been enclosed or not, and the results of the detection are written into the RAM 13.

Figure 23:
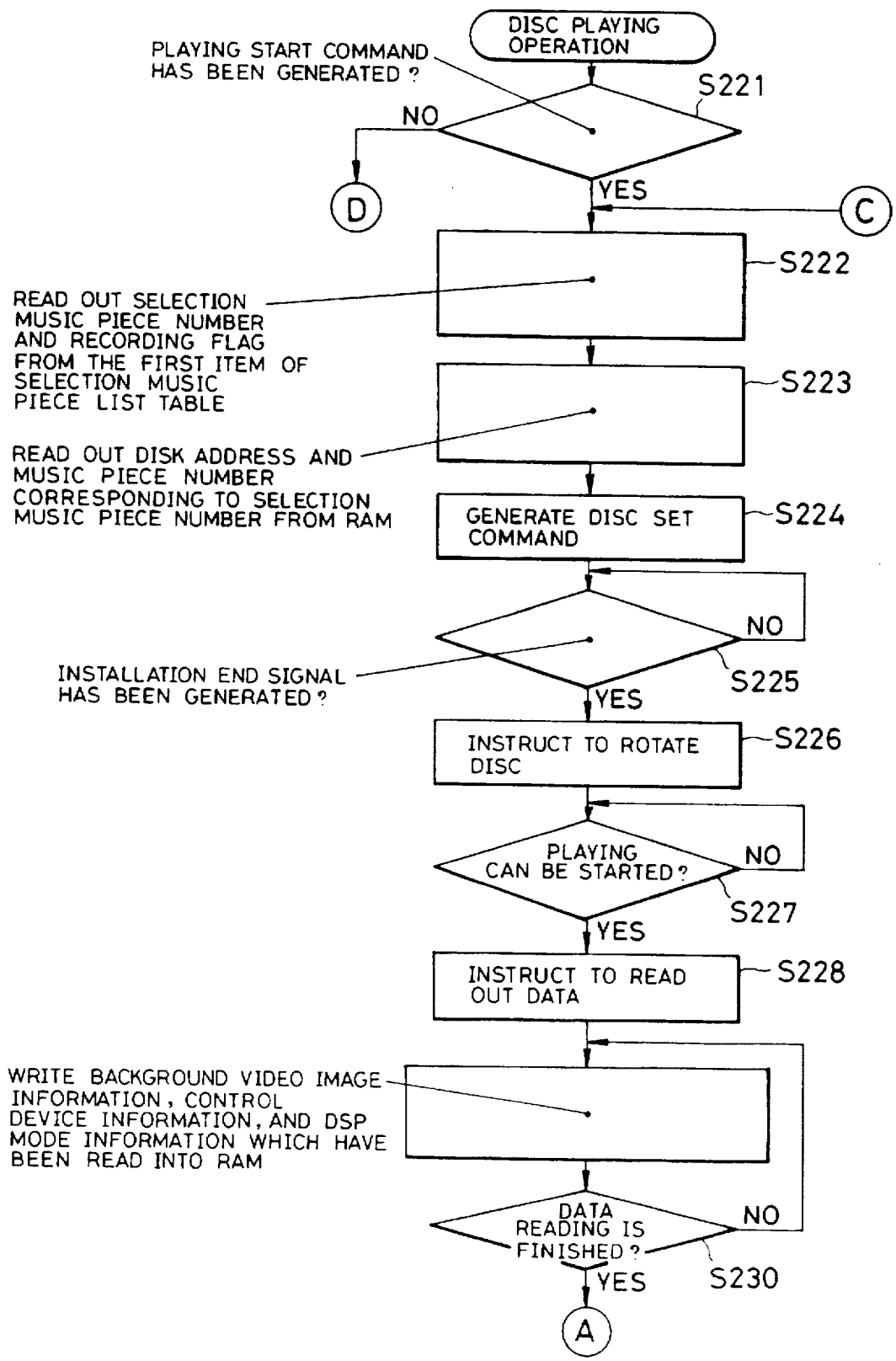
FIG. 23 is a flowchart showing the disc playing operation.
Figure 24:
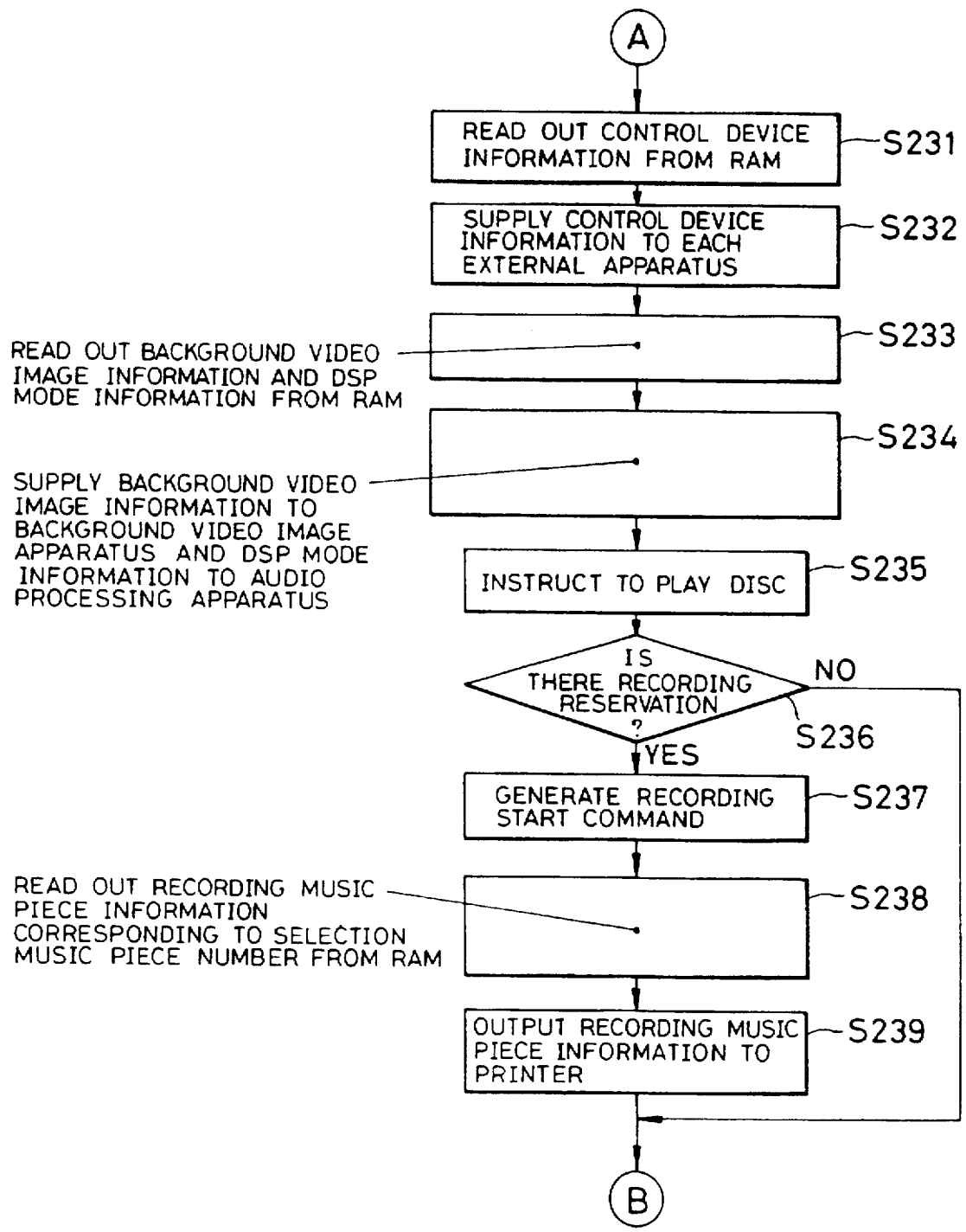
FIG. 24 is a flowchart showing a continuing portion of the disc playing operation in FIG. 23.
Figure 25:
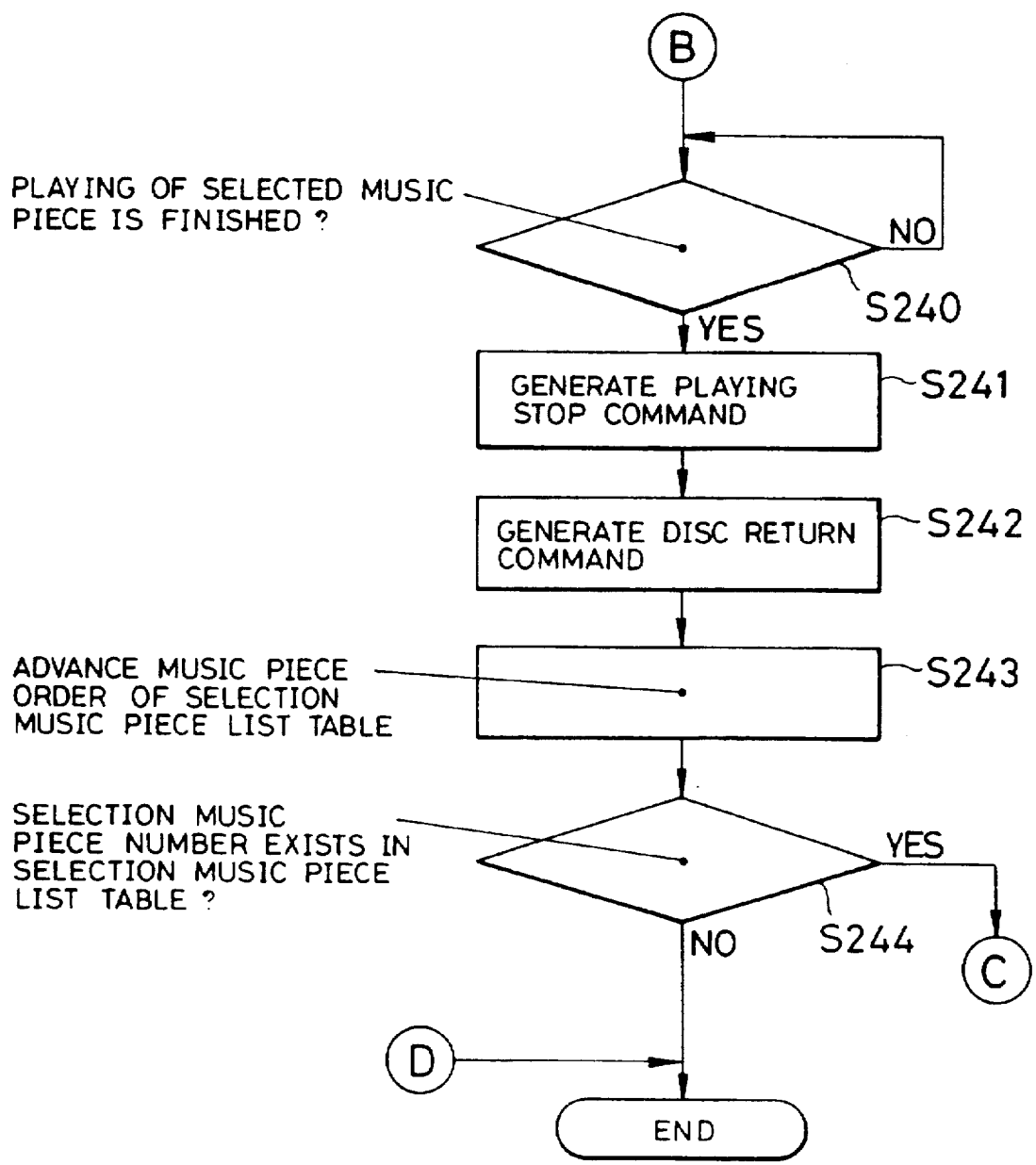
FIG. 25 is a flowchart showing a continuing portion of the disc playing operation in FIG. 24.

The disc playing operation will now be described with reference to FIGS. 23 to 25. The operations in steps S221 to S228 are substantially the same as those in steps S21 to S28 shown in FIG. 8. After step S228, the player section 4 reads out the data from the non-real-time file area of the disc and outputs it. The read data is supplied to the system controller 7 through the data separating circuit 6 and is once stored into a buffer memory (not shown) in the system controller 7. The system controller 7 sequentially writes the (14) background video image information, (15) control device information, and (16) DSP mode information mentioned above in the intrachapter common information with respect to the music piece number which were read out from the data supplied into the RAM 13 in the outside (step S229). A check is made to see if the data reading operation by the player section 4 has been finished or not (step S230). In the embodiment, the background video image information, control device information, and DSP mode information are the control set information of the external apparatus.

Until the end of the reading operation of the data is known, the data supplied by the execution in step S229 is written into the RAM 13. After the reading of the data has been finished, the control device information is read out from the RAM 13 (step S231) and supplied to each of the external apparatuses (step S232). As shown in FIG. 11, in the control device information, one bit corresponds to one external apparatus and, when the value of the bit is equal to "1", this means that the external apparatus corresponding to such a bit can be controlled. In the apparatus, since the illuminating apparatus 25, background video image apparatus 26, and audio processing apparatus 27 are provided as external apparatuses, the 1-bit data corresponding to those external apparatuses is supplied. When the supplied 1-bit data is equal to "1", therefore, its external apparatus is set into the set state in which the external apparatus can be controlled in accordance with the real-time data.

After step S232 has been executed, the system controller 7 reads out the background video image information and DSP mode information from the RAM 13 (step S233) and supplies the background video image information to the background video image apparatus 26 and also supplies the DSP mode information to the audio processing apparatus 27 (step S234). The background video image apparatus 26 is set into an operating state in accordance with the supplied background video image information. That is, one of the video images which are stored in the recording medium playing apparatus, which is selected according to image, situation, location, season, and the like of the music piece, or the photographing video image of a singer or the like is designated, and it is set that the designated background video image signal is outputted. In the audio processing apparatus 27, a processing program of the DSP and the data such as reverberation time, multiplication coefficients, and the like for the sound field control are set in accordance with the DSP mode information. For instance, the above data is set to a value suitable for the selected music piece.

Since the external apparatuses 25 to 27 are set into an operative mode in accordance with the real-time data by the above operation, the system controller 7 instructs the disc playing from the track of the music piece number which has been read out (step S235). Therefore, the player section 4 starts to play the music piece designated by the music piece selection number.

Whether there is a recording reservation or not is judged from the recording flag which has been read out (step S236). When the recording flag is set to "1", a recording start command is generated to the recording apparatus 16 (step S237). Since the audio signal including the singing sound is supplied from the amplifier 18 to the recording apparatus 16, the recording to the compact disc is executed in response to the recording start command.

After step S237 has been executed, the system controller 7 reads out the recording music piece information corresponding to the music piece selection number which has been read out in step S222 from the RAM 13 (step S238). The recording music piece information is at least the music title name, songwriter name, and composer name. Information such as singer, recording date and time, Location, and the like can be also added. After the recording music piece information has been read out, it is supplied to the printer 17 (step S239). The printer 17 prints the recording music piece information to a label which is designed so as to be adhered to the compact disc. With such a construction, by adhering the label to the label surface of the recorded compact disc, the record regarding the recorded music pieces is derived.

Practically speaking, after step S239 has been executed, the playing sound of the designated music piece is outputted by the operation delay of the player section 4. It is, however, also possible to instruct the playing of the disc from the track of the read-out music piece number after the operations in steps S236 to S239 were executed.

In the disc playing, the data outputted from the player section 4 is separated by the data separating circuit 6 and the video image signal and audio signal reproduced from the compressed image data and compressed audio data are supplied to the display 22 and speaker 19. The real-time data separated by the data separating circuit 6 is supplied to the illuminating apparatus 25, background video image apparatus 26, and audio processing apparatus 27. The illuminating apparatus 25, therefore, has already been set into the state in which it can be controlled in accordance with the real-time data in the case where the 1-bit data supplied in the control device information is equal to "1" upon operation in step S232, so that the illuminance and color of the illumination change in accordance with the real-time data. The operating state of the background video image apparatus 26 has been set in accordance with the background video image information by the operation in step S234 in the case where the 1-bit data supplied in the control device information is equal to "1" upon operation in step S232. The contents and color of the background video image, therefore, change in accordance with the real-time data. The sound field control state of the audio processing apparatus 27 has also been set in accordance with the DSP mode information by the operation in step S234 in the case where the 1-bit data supplied in the control device information is equal to "1" upon operation in step S232. For example, therefore, the reverberation time and sound volume of the singing sound further change in accordance with the real-time data.

In the case where the 1-bit data supplied in the control device information is equal to "0", the illuminating apparatus 25, background video image apparatus 26, and audio processing apparatus 27 operate in accordance with their own programs. In this case, the illuminating apparatus 25 and the like can also operate in accordance with the reproduced karaoke playing sound. It is also possible that the background video image apparatus 26 and audio processing apparatus 27 are not controlled in accordance with the real-time data even in the case where the supplied 1-bit data is equal to "1".

After step S239 has been executed, the system controller 7 judges whether the playing of the selected music piece has been finished or not (step S240) by checking the time information in the control data that is supplied from the data separating circuit 6 by the playing of the disc. After completion of the playing of the selected music piece, a playing stop command is generated to the player section 4 (step S241). A disc return command is generated to the disc conveying section 3 (step S242). The player section 4, accordingly, stops the disc playing operation. After the rotation of the turntable has been stopped, the disc conveying section 3 conveys the disc on the turntable to a enclosing position where the disc was in the disc enclosing section 2 and encloses therein. After the disc return command has been generated, the system controller 7 progresses the music piece order in the selection music piece list table by one (step S243) and discriminates whether the music piece selection number has been recorded at the first order in the selection music piece list table or not (step S244). If the music piece selection number has been recorded, the processing routine is returned to step S222 and the above operations are repeated. On the other hand, when the music piece selection number is not recorded, the playing operation is finished.

Figure 26:
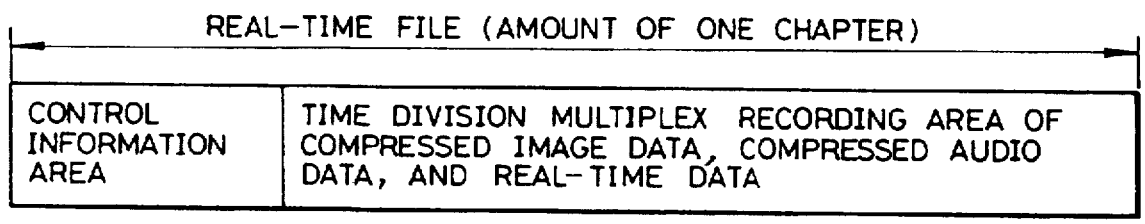
FIG. 26 is a diagram showing a file construction of each chapter unit of a real-time file area.

In the above embodiment, the player section 4 reads out the data from the non-real-time file area of the disc and outputs the data in accordance with the read command of the data in step S228. The invention, however, is not limited to such a construction. For instance, since the control information area is provided in the head portion of the file of each chapter unit in each real-time file area as shown in FIG. 26, it is also possible to record the intrachapter common information of only the music pieces of the chapter and to read out the background video image information, control device information, and DSP mode information from the control information area.

In the present invention, the recording medium on which at least the karaoke playing sounds of a plurality of music pieces have been recorded is not limited to the disc but any other recording medium such as a tape or the like can be also obviously used.

It is needless to say that the recording medium, on which at least karaoke playing sounds for a plurality of music pieces are recorded, is not limited to a recording disk, and other recording medium such as a magnetic tape may be used in the apparatus according to the present invention.

Although the invention has been described with respect to the case of reproducing a medium on which the information which has been image compressed by an MPEG or the like is recorded, further, the invention is not limited to such a case. A similar effect can be also obtained so long as a medium to which control information to control the external apparatuses can be added.

In the karaoke reproducing apparatus according to the third feature of the invention as mentioned above, when one of a plurality of music pieces is selected by the operation, the control set information of the selected music piece is read out from the recording medium and the external apparatus is set into the set state corresponding to the control set information and, after that, the playing of the selected music piece is started. The external apparatus, therefore, can be set into the operative state until the start of the karaoke playing of the selected music piece even if a memory of a large capacity to store the control set information of the external apparatus is not provided in the apparatus. The costs of the apparatus can be reduced. There is also an advantage such that even if a new karaoke music piece is added, there is no need to perform a troublesome operation to previously store the control set information into the memory.

Figure 27:
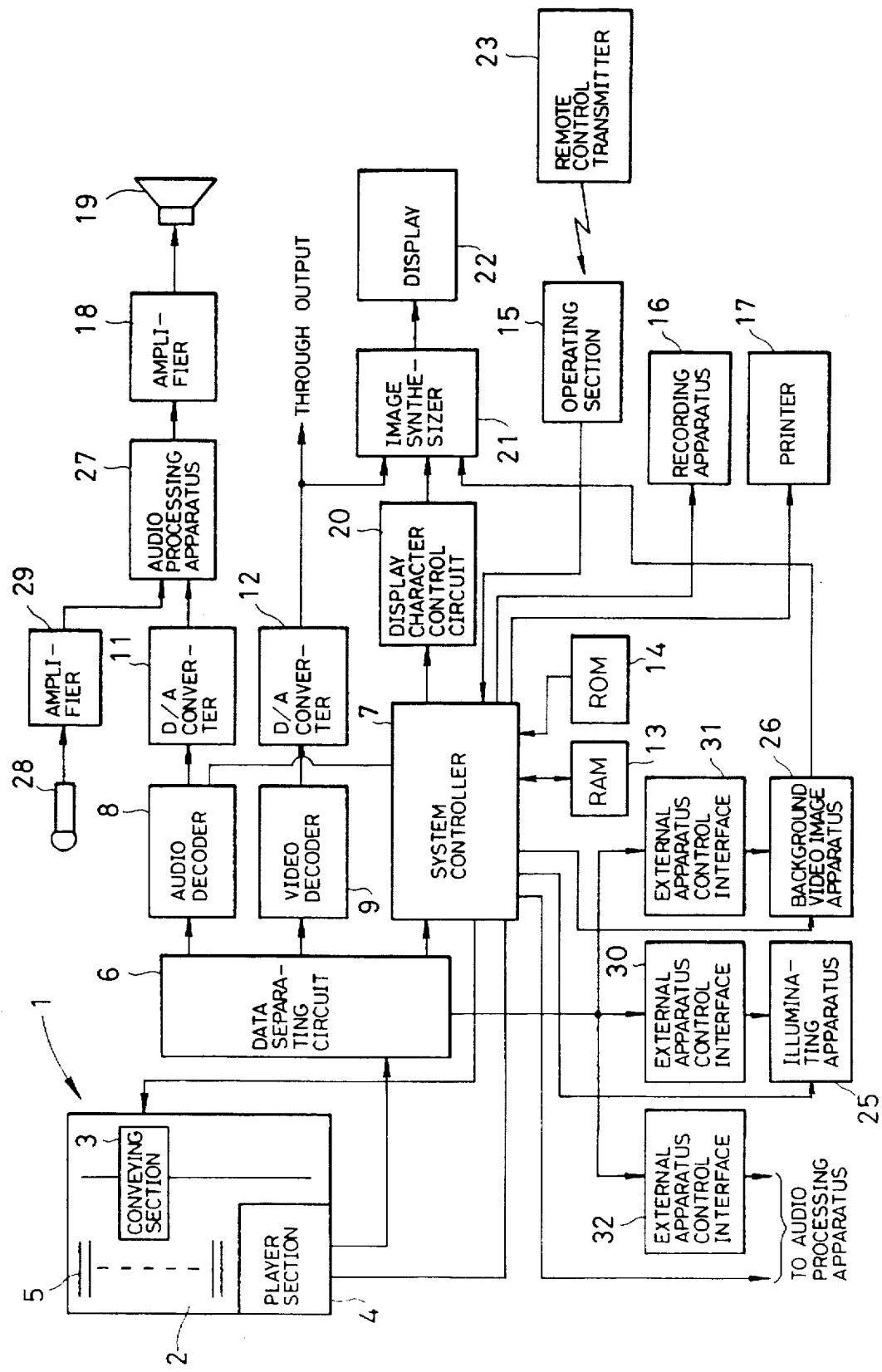
FIG. 27 is a block diagram showing an embodiment of the invention.

The fourth embodiment of the invention will now be described. In the embodiment, a karaoke reproducing apparatus has a construction shown in FIG. 27 and the portions 1 to 26 are the same as the corresponding portions in the construction shown in FIG. 22 and their descriptions are omitted. In FIG. 27, external apparatus control interfaces 30 to 32 each having the function to convert the real-time data are provided between the data separating circuit 6 and the illuminating apparatus 25, background video image apparatus 26, and audio processing apparatus 27. For instance, each of the interfaces 30 to 32 is constructed by a microcomputer and, further, has an internal memory (not shown) in which a part of a conversion table has previously been written. The conversion table differs in accordance with the external apparatus which is connected.

In the disc playing in the embodiment, the data outputted from the player section 4 is separated by the data separating circuit 6. The video image signal and the audio signal which were reproduced from the compressed image data and the compressed audio data are supplied to the display 22 and the speaker 19. The real-time data separated by the data separating circuit 6 is supplied to the external apparatus control interfaces 30 to 32. Each of the interfaces 30 to 32 repetitively execute the same operation as follows.

Figure 28:
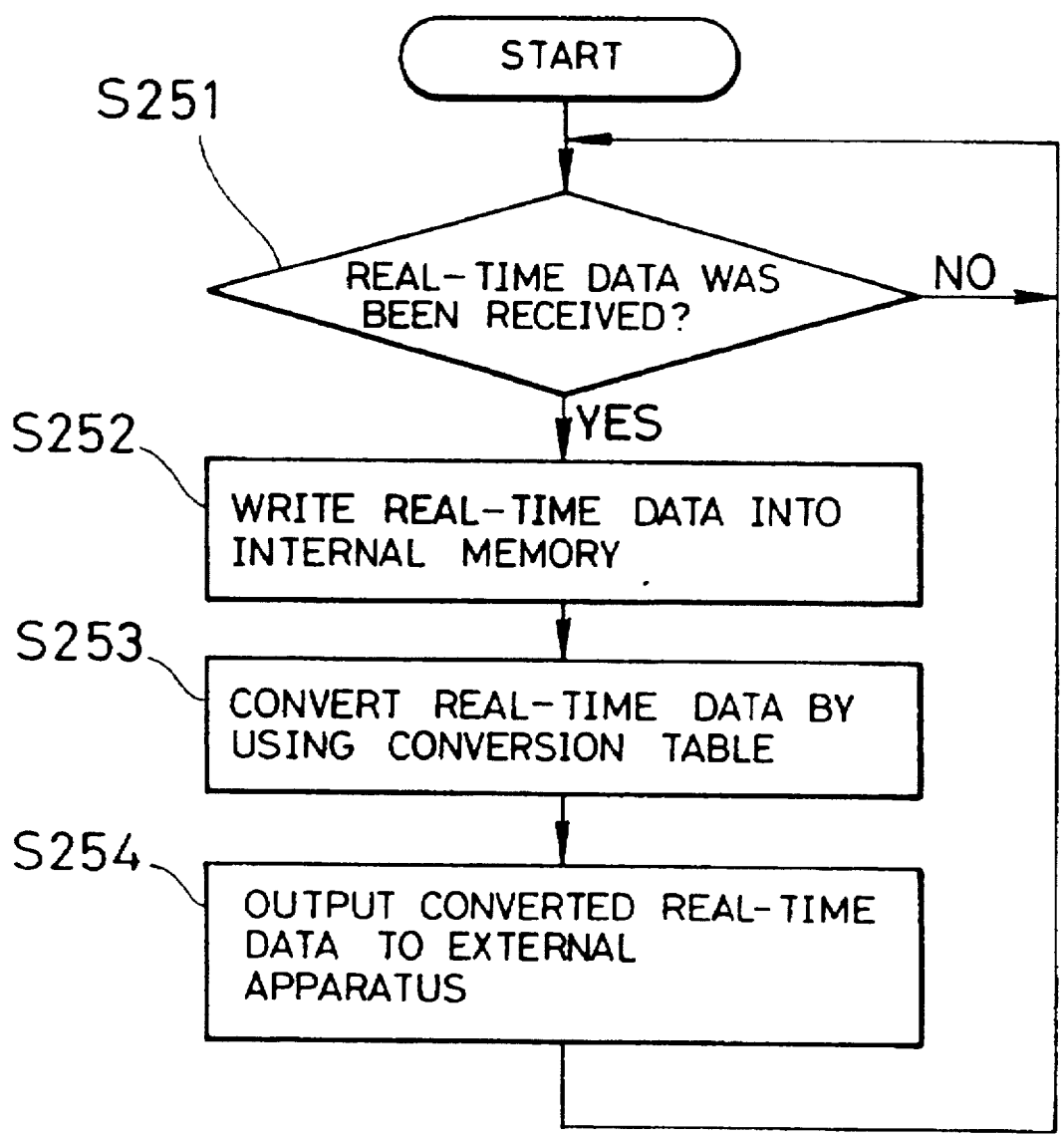
FIG. 28 is a flowchart showing the operation of an external apparatus control interface.

As shown in FIG. 28, a check is first made to see if the real-time data of a predetermined unit has been received or not (step S251). When the real-time data of a predetermined unit is received, it is written into the internal memory (step S252). The real-time data is converted by using the above conversion table (step S253). The converted real-time data is supplied to the external apparatus (step S254). That is, in the case of the interface 30, the real-time data is supplied to the illuminating apparatus 25. In the case of the interface 31, the real-time data is supplied to the background video image apparatus 26. In the case of the interface 32, the real-time data is supplied to the audio processing apparatus 27. Since the conversion tables in the interfaces 30 to 32 differ, the real-time data which is supplied to the external apparatuses 25 to 27 have different contents.

In the case where the supplied 1-bit data in the control device information is equal to "1" upon operation in step S232, since the illuminating apparatus 25 has already been set into the set state in which it can be controlled in accordance with the real-time data, the illuminance and color of the illumination change in accordance with the real-time data supplied from the interface 30. In the case where the supplied 1-bit data in the control device information is equal to "1" upon operation in step S232, since the operating state of the background video image apparatus 26 has been set in accordance with the background video image information by the operation in step S234, the contents and color of the background video image change in accordance with the real-time data supplied from the interface 31. In the case where the supplied 1-bit data in the control device information is equal to "1" upon operation in step S232, since the sound field control state of the audio processing apparatus 27 has also been set in accordance with the DSP mode information by the operation in step S234, for example, the reverberation time and sound volume of the singing sound further change in accordance with the real-time data supplied from the interface 32.

In the case where the supplied 1-bit data in the control device information is equal to "0", each of the illuminating apparatus 25, background video image apparatus 26, and audio processing apparatus 27 operates in accordance with its own program. In this case, the illuminating apparatus 25 and the like can also operate in accordance with the reproduced karaoke playing sound.

In the above embodiment, although each of the external apparatus control interfaces 30 to 32 merely converts the real-time data in accordance with the conversion table, it is also possible to construct in the following manner. That is, the information such as genre of music piece, tempo, season, theme of music piece, situation, district, and the like in the intrachapter common information which has been read out from the non-real-time file area or from the control information area of the above real-time file area is supplied to the external apparatus control interfaces 30 to 32 by the system controller 7, and the interfaces 30 to 32 convert the real-time data on the basis of the conversion table and the information from the system controller 7.

With respect to the selected music piece, for example, it is now assumed that the genre of music piece is set to ENKA (popular ba lad), the tempo is set to slow, the season is set to winter, the theme of music piece is set to love, the situation is set to pub restaurant, and the district is set to northeast. In this case, the external apparatus control interface 30 first controls in a manner such that a mirror ball (not shown) of the illuminating apparatus 25 is slowly rotated, the illumination is set to be dark as a whole, and a background effect machine is set to snow. After that, when the playing of the music piece is started, the illuminating apparatus 25 operates in accordance with the set conditions. When a climax portion of the music piece comes after that, the illumination is set to be light in accordance with the real-time data and the rotational speed of the mirror ball is raised.

In the invention, the recording medium on which at least the karaoke playing sounds of a plurality of music pieces have been recorded is not limited to the disc but any other recording medium such as a tape or the like can be also obviously used.

Although the present invention has been described with respect to the case of reproducing the medium on which the information which had been image compressed by the MPEG or the like has been recorded, the invention is not limited to such a case. A similar effect, further, can be also obtained so long as a medium to which control information to control the external apparatus can be added is used.

As mentioned above, in the karaoke reproducing apparatus according to the fourth feature of the invention, when one of a plurality of music pieces is selected by the operation, the recording medium is played with regard to the selected music piece, the real-time data is obtained simultaneously with the reproduction of the karaoke playing sound, and the real-time data is converted so as to be adapted to the external apparatus and is supplied to the external apparatus. An arbitrary external apparatus, therefore, can be controlled by one real-time data which changes in accordance with the karaoke playing sound. By changing the conversion pattern of the data conversion, the control contents of the external apparatus can be freely changed.

The fifth embodiment of the invention will now be described.

Figure 29:
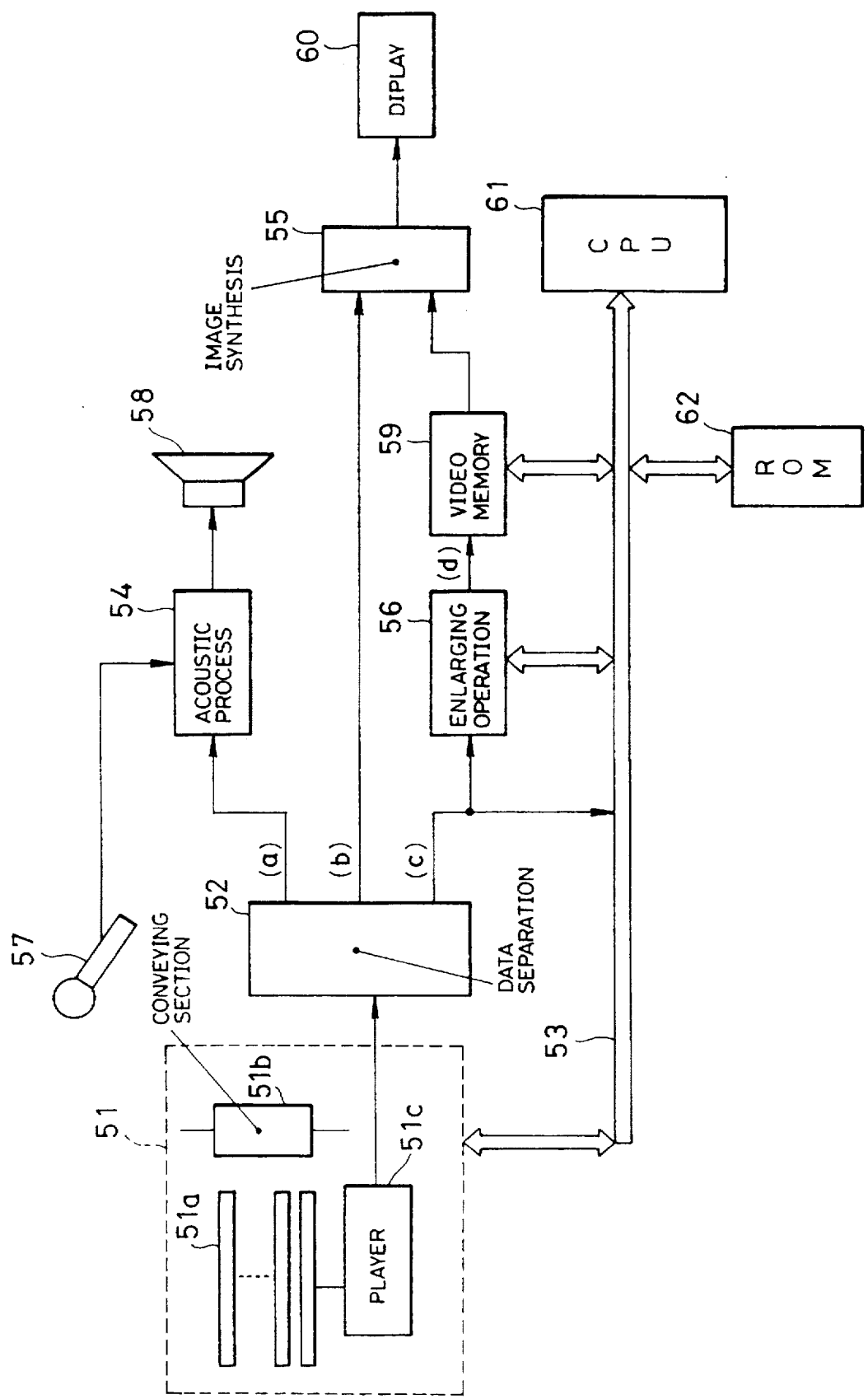
FIG. 29 is a diagram showing a construction of a karaoke apparatus to which a recording information reproducing apparatus according to the invention is applied.

FIG. 29 shows a construction of a karaoke reproducing apparatus to which a recording information reproducing apparatus according to the invention has been applied.

In the diagram, a plurality of recording discs 51a, a disc conveying section 51b, and a player section 51c are provided in a disc player 51 of the automatic changer type. In the disc playing by such a disc player 51, one of the plurality of recording discs 51a is conveyed onto a turntable (not shown) of the player section 51c by the conveying section 51b. The player section 51c plays the recording disc on the turntable and obtains the read signal and supplies to a data separating circuit 52. Such an automatic changer type disc player 51 executes the operation as mentioned above in accordance with various kinds of player control commands which are supplied through a CPU bus 53. The player 51 sends a player state information signal indicative of the operating state of the player to the CPU bus 53.

In addition to the audio signal and video image signal corresponding to the karaoke music pieces, the image data signal in which the character information to form the song words has been converted into image data has been recorded on each of the discs 51a.

Figure 30:
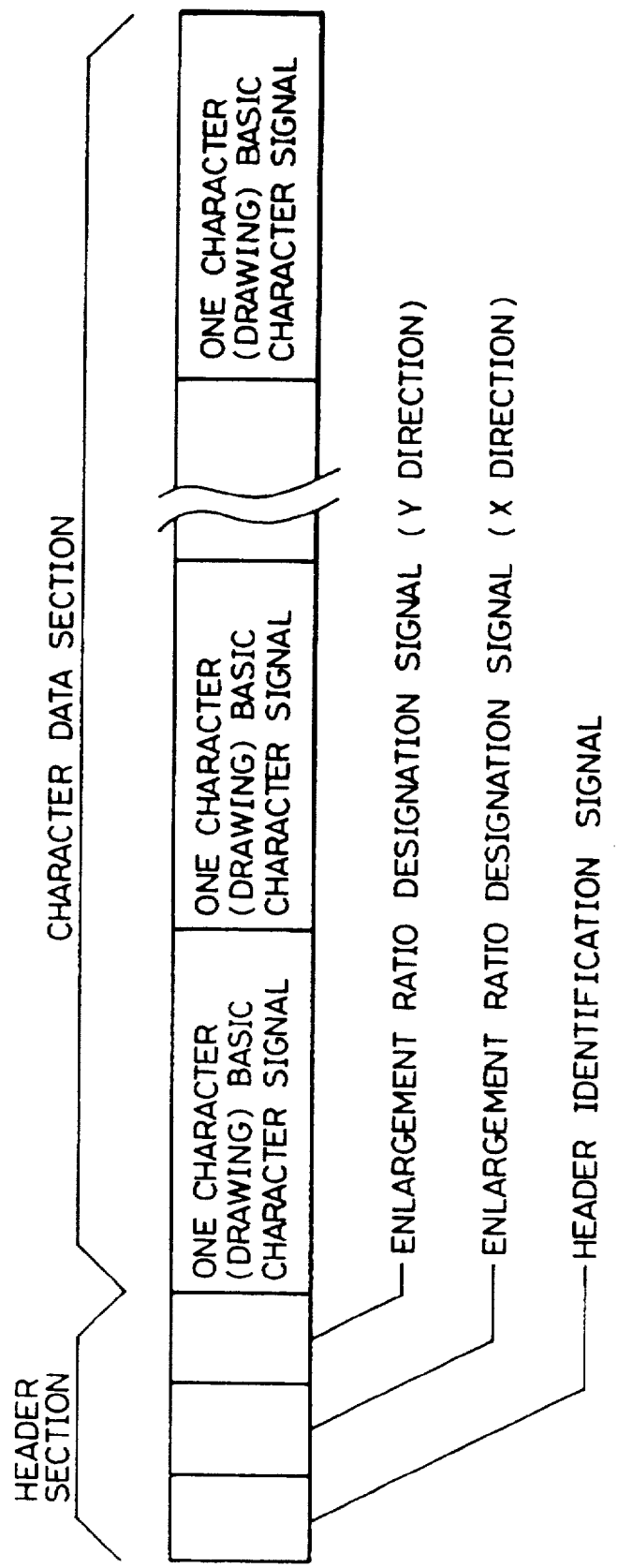
FIG. 30 is a diagram showing a format of an image data signal of a recording disc according to the invention.

FIG. 30 is a diagram showing a signal format of the image data signal.

As shown in the diagram, the image data signal is constructed by a header section and a character data section. Basic character signals in which the character of one character or one figure has been converted into the image data by the number of dots of the minimum unit are recorded in the character data section by the number as many as a plurality of characters or figures.

Figure 31:
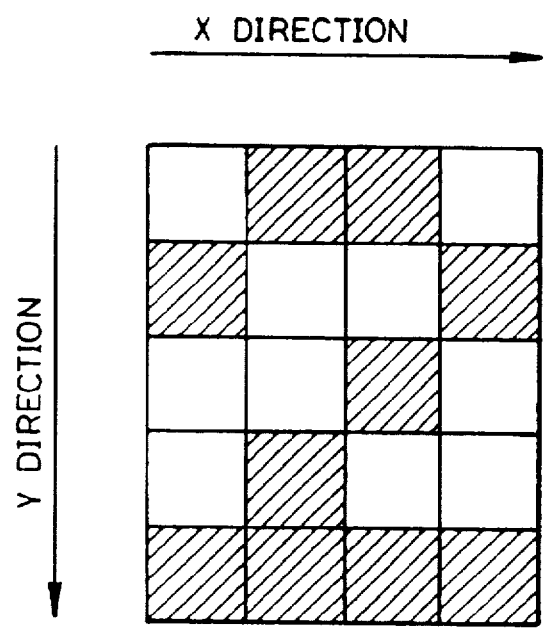
FIGS. 31 and 32 are diagrams showing examples of an image display by a basic character signal.
Figure 32:
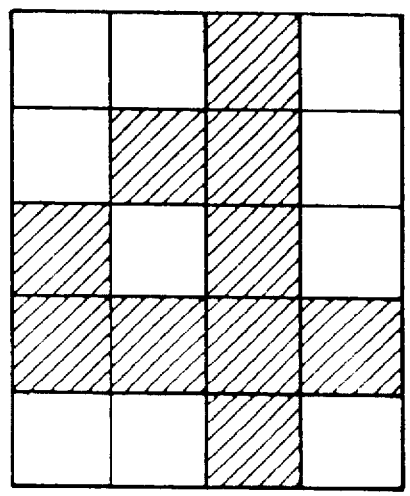

FIGS. 31 and 32 show examples of the display in the case where numerals "2" and "4" as character information were converted into the image data by setting the number of dots of the minimum unit into 20 (=4×5).

In the diagram, for example, assuming that the blank dot is set to "0" and the dot in the hatched portion is set to "1", the numerals "2" and "4" can be expressed as follows.

"2"="0110, 1001, 0010, 0100, 1111"

"4"="0010, 0110, 1010, 1111, 0010"

That is, in this case, the digital signal of 20 bits is recorded as a basic character signal into the character data section. A header identification (ID) signal indicative of the head position of such an image data signal and enlargement ratio designation signals (X direction, Y direction) to designate the size of character on the display are recorded in the header portion in FIG. 2. The enlargement ratio designation signals designate enlargement ratios to enlarge in the X and Y directions, respectively, by using the size of image display in the basic character signal as shown in FIG. 31 as a reference.

The data separating circuit 52 in FIG. 29 separates and extracts an audio signal (a), a video image signal (b), and an image data signal (c) as mentioned above from the read signal supplied from the disc player 51, respectively. In this instance, the audio signal (a) is supplied to an acoustic processing circuit 54. The video image signal (b) is supplied to an image synthesizing circuit 55. The image data signal (c) is supplied to an enlargement operating circuit 56 and is also sent to the CPU bus 53. The acoustic processing circuit 54 supplies to a speaker 58 the signal in which a synthetic signal obtained by synthesizing the audio signal supplied from the data separating circuit 52 and the audio signal supplied from a microphone 57 has been amplified to a desired level.

The enlargement operating circuit 56 executes an enlargement operation to each basic character signal in the image data signal (c) at the enlargement ratios based on an X-direction enlargement ratio signal and a Y-direction enlargement ratio signal which are supplied through the CPU bus 53, thereby obtaining an enlargement character signal (d) and supplying to a video memory 59. In this instance, the enlargement operating circuit 56 sends an enlargement operation end signal to the CPU bus 53 each time the enlargement operating process for one basic character signal is finished.

The video memory 59 stores the enlargement character signal (d) in accordance with a memory write signal which is supplied through the CPU bus 53. The contents stored, namely, the enlargement character signals (d) are sequentially read out from the video memory 59 in accordance with a memory read signal which is supplied through the CPU bus 53 and are supplied to the image synthesizing circuit 55. The image synthesizing circuit 55 synthesizes the enlargement character signal (d) supplied from the video memory 59 to the video image signal (b) supplied from the data separating circuit 52 and supplies the synthetic video image signal to a display 60. A CPU (Central Processing Unit) 61 executes various kinds of operation controls of the karaoke apparatus with the construction as mentioned above through the CPU (bus) 53 in accordance with the operating procedure stored in an ROM (Read Only Memory) 62.

The operation of the recording information reproducing apparatus according to the invention applied to such a karaoke apparatus will now be described.

Figure 33:
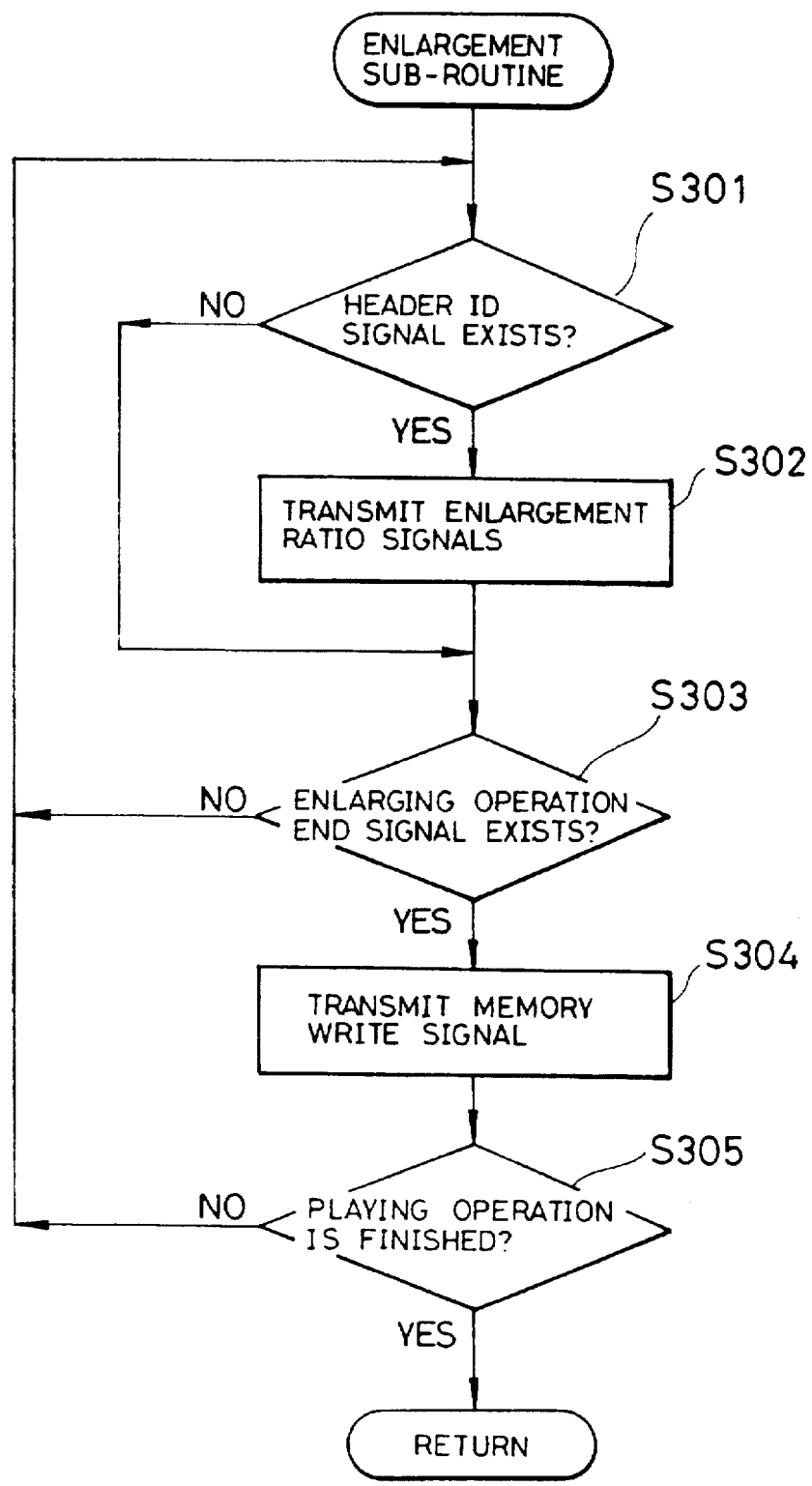
FIG. 33 is a diagram showing a subroutine flow of a character enlargement control which is executed by the recording information reproducing apparatus according to the invention.

FIG. 33 shows a subroutine flow for the character enlargement control which is executed by the recording information reproducing apparatus according to the invention.

First, the CPU 61 discriminates whether the header ID signal exists on the CPU bus 53 or not (step S301). In step S301, when it is judged that the header ID signal exists, the CPU 61 reads the enlargement ratio designation signals (X direction and Y direction) which are transmitted subsequent to the header ID signal and sends them to the enlargement operating circuit 56 as X-direction enlargement ratio signal and Y-direction enlargement ratio signal (step S302). By the control in step S302, the enlargement operating circuit 56 fetches the X-direction and Y-direction enlargement ratio signals and fixes the operating mode of the enlargement operating circuit 56 itself to an enlargement operating mode such as to execute the enlargement operating process according to the enlargement ratios.

After completion of step S302 or in the case where it is judged that the header ID signal doesn't exist in step S301, the CPU 61 discriminates whether an enlargement operation end signal exists on the CPU bus 53 or not (step S303). When it is judged in step S303 that the enlargement operation end signal doesn't exist, the CPU 61 returns to the operation control in step S301 and repetitively executes the control as mentioned above. In step S303, when it is judged that the enlargement operation end signal exists, the CPU 61 sends a memory write signal to the video memory 59 (step S304). By the control in step S304, the video memory 59 stores the enlargement character signals corresponding to one character which were subjected to the enlarging process. The CPU 61 subsequently reads a player state information signal existing on the CPU bus 53 and checks whether the disc player 51 has already finished the playing operation or not (step S305). When it is determined in step S305 that the playing operation is not finished, the CPU 61 returns to the operation control in step S301 and repetitively executes the control as mentioned above. When it is judged in step S305 that the playing operation has been finished, the CPU 61 exits the subroutine flow of such a character enlargement control and executes the main control.

The enlarging operation of the character by such a character enlargement control will now be described.

Figure 34:
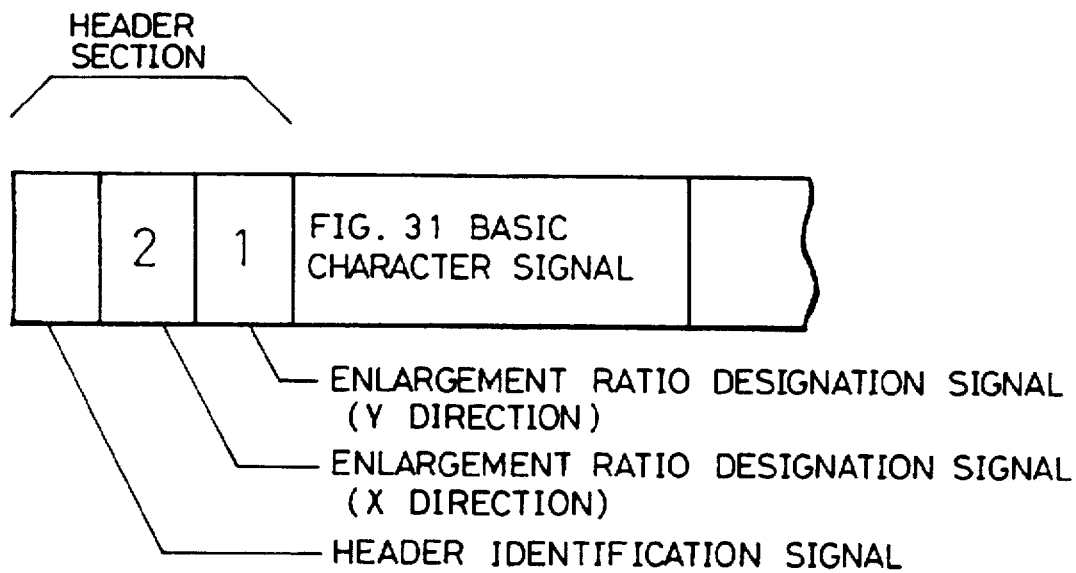
FIGS. 34 to 36 are diagrams for explaining the enlarging operation of characters.

The case where an image data signal as shown in FIG. 34 has been recorded on the recording disc 51a will be first considered.

In such an image data signal, the digital signal of 20 bits |=(4 bits in the X direction)×(5 bits in the Y direction)| obtained by converting a numeral "2" shown in FIG. 31 into the image data has been recorded as a basic character signal. Designation signals to designate that the signal is enlarged two times in the X direction and is also enlarged one time in the Y direction when displaying such a signal to the display 60 have been recorded in the header portion. The disc player 51 and the data separating circuit 52 read and reproduce such an image data signal as shown in FIG. 34 from the recording disc 51a and send to the CPU bus 53 as an image data signal (c). In this instance, the CPU 61 detects the header ID signal in the image data signal (c) sent onto the CPU bus 53 and reads the enlargement ratio designation signals (X direction and Y direction) which are sent subsequent to the header ID signal by the control in steps S301 and S302. In this instance, since the enlargement ratio designation signals designate that the signal is enlarged two times in the X direction and is also enlarged one time in the Y direction as shown in FIG. 34, the CPU 61 transmits the X-direction enlargement ratio signal indicative of the enlargement of two times and the Y-direction enlargement ratio signal indicative of one time to the enlargement operating circuit 56.

Figure 37:
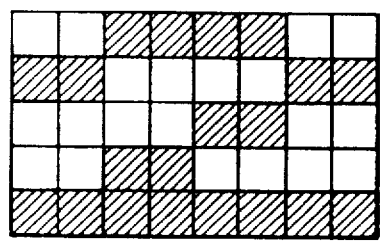
FIGS. 37 to 39 are diagrams for explaining the enlarging operation of characters.

The enlargement operating circuit 56 fixes its arithmetic calculating operation into the enlargement operating mode to execute the enlargement of two times in the X direction and the enlargement of one time in the Y direction. Subsequently, the enlargement operating circuit 56 executes the enlargement operation of the basic character signal comprising 20 bits in the image data signal (c) as shown in FIG. 34 in the enlargement operating mode. In this instance, since the signal is enlarged two times in the X direction and is enlarged one time in the Y direction, the enlargement operating circuit 56 generates the enlargement character signal (d) of 40 bits |=(8 bits in the X direction)×(5 bits in the Y direction)|. Such an enlargement character signal (d) is supplied to the display 60 through the video memory 59 and the image synthesizing circuit 55 and is displayed as shown in FIG. 37.

Figure 35:
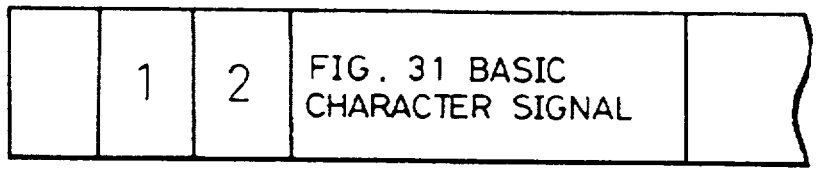

The case where an image data signal as shown in FIG. 35 has been recorded on the recording disc 51a will now be considered.

In such an image data signal, the digital signal of 20 bits |=(4 bits in the X direction)×(5 bits in the Y direction)| obtained by converting a numeral "2" shown in FIG. 31 into the image data has been recorded as a basic character signal. Further, designation signals to designate that the signal is enlarged one time in the X direction and is enlarged two times in the Y direction when displaying such a signal by the display 60 have been recorded in the header section. The disc player 51 and data separating circuit 52 read and reproduce the image data signal as shown in FIG. 35 from the recording disc 51a and transmit them to the CPU bus 53 as an image data signal (c). In this instance, the CPU 61 detects the header ID signal in the image data signal (c) sent onto the CPU bus 53 and reads the enlargement ratio designation signals (X direction and Y direction) which are sent subsequent to the header ID signal by the control in steps S301 and S302. In this instance, since the enlargement ratio designation signals designate that the enlargement of one time in the X direction and the enlargement of two times in the Y direction as shown in FIG. 35, the CPU 61 sends the X-direction enlargement ratio signal indicative of the enlargement of one time and the Y-direction enlargement ratio signal indicative of the enlargement of two times to the enlargement operating circuit 56, respectively.

Figure 38:
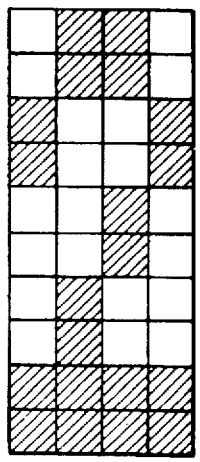

The enlargement operating circuit 56 fixes its arithmetic calculating operation into an enlargement operating mode to enlarge the signal one time in the X direction and to enlarge the signal two times in the Y direction. The enlargement operating circuit 56 subsequently executes an enlarging operation of the basic character signal comprising 20 bits in the image data signal (c) as shown in FIG. 35 in the enlargement operating mode. In this instance, since the signal is enlarged one time in the X direction and is enlarged two times in the Y direction, the enlargement operating circuit 56 generates the enlargement character signal (d) of 40 bits |=(4 bits in the X direction)×(10 bits in the Y direction)|. Such an enlargement character signal (d) is supplied to the display 60 through the video memory 59 and the image synthesizing circuit 55 and is displayed as shown in FIG. 38. That is, even when the size of character to be displayed on the display corresponds to 40 bits of the character signal as shown in FIGS. 37 and 38, it is sufficient to set a data amount of the character signal which is recorded onto the recording disc into 20 bits.

Figure 36:
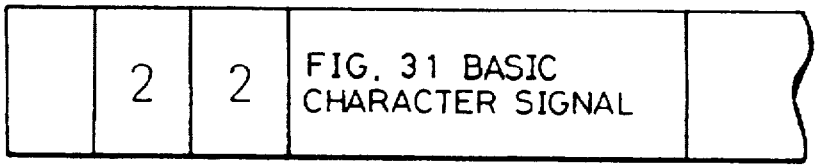

The case where an image data signal as shown in FIG. 36 has been recorded on the recording disc 51a will now be considered.

In such an image data signal, the digital signal of 20 bits |=(4 bits in the X direction)×(5 bits in the Y direction)| derived by converting a numeral "2" shown in FIG. 31 into the image data has been recorded as a basic character signal. Further, designation signals to designate that the signal is enlarged two times in the X direction and is enlarged two times in the Y direction when displaying such a signal onto the display 60 have been recorded in the header section. The disc player 51 and the data separating circuit 52 read and reproduce the image data signal as shown in FIG. 36 from the recording disc 51a and transmit it onto the CPU bus 53 as an image data signal (c). In this instance, by the control in steps S301 and S302,the CPU 61 detects the header ID signal in the image data signal (c) sent onto the CPU bus 53 and reads the enlargement ratio designation signals (X direction and Y direction) which are transmitted subsequent to the header ID signal. In this instance, since the enlargement ratio designation signals designate the enlargement of two times in the X direction and the enlargement of two times in the Y direction as shown in FIG. 36, the CPU 61 respectively transmits the X-direction enlargement ratio signal indicative of the enlargement of two times and the Y-direction enlargement ratio signal indicative of the enlargement of two times to the enlargement operating circuit 56.

Figure 39:
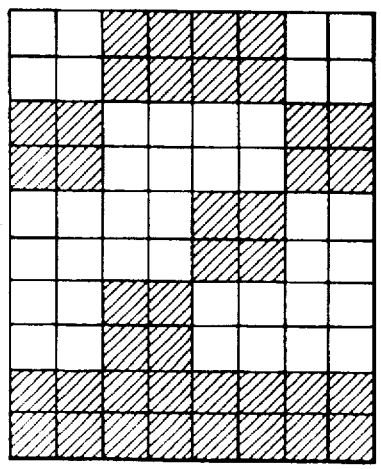

The enlargement operating circuit 56 fixes its arithmetic calculating operation into an enlargement operating mode to perform the enlargement of two times in the X direction and the enlargement of two times in the Y direction. Subsequently, the enlargement operating circuit 56 executes the enlarging operation of the basic character signal comprising 20 bits in the image data signal (c) as shown in FIG. 36 in the enlargement operating mode. In this instance, since the signal is enlarged two times in the X direction and is enlarged two times in the Y direction, the enlargement operating circuit 56 generates the enlargement character signal (d) of 80 bits |=(8 bits in the X direction)×(10 bits in the Y direction)]. The enlargement character signal (d) is supplied to the display 60 through the video memory 59 and the image synthesizing circuit 55 and is displayed as shown in FIG. 39. That is, even when the size of character to be displayed on the display corresponds to 80 bits of the character signal as shown in FIG. 39, it is sufficient to use the data amount of 20 bits for the character signal which is recorded onto the recording disc.

Although the above embodiment has been described with respect to the case where the recording information reproducing apparatus according to the invention is applied to the karaoke apparatus, the invention is not limited to such a karaoke apparatus. In brief, the invention can be also applied to any other apparatus such that recording information is reproduced from a recording medium on which character and figure information has been converted into image data and has been recorded and such character and figure information is displayed.

According to the fifth feature of the invention as mentioned above, the character signal and enlargement ratio designation signals are respectively reproduced from the recording disc on which the character signal in which the character and figure information or the like has been converted into the image data has been recorded and the enlargement ratio designation signals to designate the enlargement ratios on the display based on such a character signal have also been recorded in the head portion. The display is executed on the basis of the enlargement character signal obtained by executing the enlarging operation to the character signal at the enlargement ratios indicated by the enlargement ratio designation signals.

According to the fifth feature of the invention, therefore, even in the case where the size of character to be displayed on the display is large, it is sufficient that the data amount of character signal which is recorded on the recording disc is set to the minimum data amount enough to form one character. It is, therefore, preferable because the data amount of the character and figure information which is recorded on the recording disc can be reduced.

What is claimed is:

1. A recording medium reproducing apparatus for reproducing a recording medium on which at least sound data of a plurality of music pieces have been recorded, said apparatus comprising:

means for generating a selection music piece command to select at least one particular music piece of said plurality of music pieces;

playing means for playing said recording medium with respect to said at least one particular music piece according to said selection music piece command;

a memory for storing music title name information of at least one of said music pieces recorded on said recording medium;

means for reading said music title name information corresponding to said selection music piece command from said memory when said selection music piece command is generated; and display means for displaying said music title name information read from said memory, wherein said means for generating a selection music piece command comprises:

memory means for storing music piece classification information for said music pieces recorded on said recording medium, said music piece classification information representing at least one characteristic of said plurality of music pieces and comprising a plurality of different items;

selection means for selecting at least one item from among said items of said music piece classification information in accordance with a selection operation and for selecting at least one selected music piece which corresponds to said at least one item; and command generating means for generating said selection music piece command to select said at least one particular music piece from said at least one selected music piece.

2. A recording medium reproducing apparatus as claimed in claim 1, wherein said music title name information has been recorded on said recording medium, and wherein said music title name information is read from said recording medium and stored in said memory.

3. A karaoke reproducing apparatus for reproducing a recording medium on which at least karaoke playing sounds of a plurality of music pieces have been recorded, said apparatus comprising:

means for generating a selection music piece command to select at least one particular music piece of said plurality of music pieces;

playing means for playing said recording medium with respect to said at least one particular music piece according to said selection music piece command;

a memory for storing music title name information of at least one of said music pieces recorded on said recording medium;

means for reading said music title name information corresponding to said selection music piece command from said memory when said selection music piece command is generated; and display means for displaying said music title name information read from said memory, wherein said means for generating a selection music piece command comprises:

memory means for storing music piece classification information for said music pieces recorded on said recording medium, said music piece classification information representing at least one characteristic of said plurality of music pieces and comprising a plurality of different items;

selection means for selecting at least one item from among said items of said music piece classification information in accordance with a selection operation and for selecting at least one selected music piece which corresponds to said at least one item; and command generating means for generating said selection music piece command to select said at least one particular music piece from said at least one selected music piece.

4. An apparatus according to claim 3, wherein said music title name information, which has been recorded on said recording medium, is previously read from the recording medium and recorded into said memory before said selection music piece command is generated.

5. A recording medium for playing in a recording medium reproducing apparatus which comprises means for generating a selection music piece command to select one music piece of a plurality of music pieces in accordance with a selection operation and playing means for playing said one music piece according to said selection music piece command, said recording medium comprising:

at least an information area in which information relating to music pieces are recorded on said recording medium, said information relating to music pieces including music title name information and music classification information; and at least a data area in which at least sound data of said music pieces recorded on said recording medium is recorded, wherein said information area and said data area together constitute an information recording area of said recording medium, wherein said music title name information and said music classification information constitute search criteria which are evaluated during said selection operation to enable said recording medium reproducing apparatus to select said one music piece of said plurality of music pieces.

6. A recording medium as claimed in claim 5, wherein said music classification information comprises theme information for said music pieces which corresponds to the themes of said music pieces.

7. A recording medium as claimed in claim 5, wherein said music classification information comprises situation information for said music pieces which corresponds to situations of said music pieces.

8. A recording medium as claimed in claim 5, wherein said music classification information comprises genre information for said music pieces which corresponds to genres of said music pieces.

9. A recording medium as claimed in claim 5, wherein said music classification information comprises control information for said music pieces which indicates an external apparatus which can be controlled by control data recorded on said recording medium.

10. A recording medium reproducing apparatus for reproducing a recording medium on which at least sound data of a plurality of music pieces have been recorded, wherein said apparatus comprises:

memory means for storing music piece classification information for said music pieces recorded on said recording medium, wherein said music piece classification information represents at least one characteristic of said plurality of music pieces and comprises a plurality of different items;

selection means for selecting at least one item of said items of said music piece classification information in accordance with a selection operation and for selecting at least one selected music piece which corresponds to said at least one item; and searching means for searching said memory means for at least one particular music piece from said at least one selected music piece.

11. An apparatus according to claim 10, wherein said music piece classification information of said music pieces is recorded on said recording medium, and wherein the music piece classification information of said music pieces is previously read from said recording medium and stored in said memory means before said selection operation is performed.

12. A recording medium reproducing apparatus as claimed in claim 10, wherein said music piece classification information is recorded on said recording medium in the form of code data.

13. An apparatus according to claim 10, further comprising display means for displaying a music title name of said at least one particular music piece.

14. An apparatus according to claim 10, further comprising playing means for reproducing said at least one particular music piece.

15. A recording medium reproducing apparatus for reproducing a recording medium on which at least sound data of a plurality of music pieces have been recorded, wherein said apparatus comprises:

memory means for storing music piece classification information for said music pieces recorded on said recording medium, wherein said music piece classification information represents at least one characteristic of said plurality of music pieces and comprises a plurality of different items;

selection means for generating an item content selection command to select at least one item of said items of said music piece classification information in accordance with a selection operation; and searching means for searching said memory means for at least one particular music piece corresponding to said at least one item selected by said item content selection command, wherein said selection means generates said item content selection command based on a plurality of selection operations, wherein said plurality of selection operations respectively select at least two items among said different items in said music piece classification information.

16. A recording medium reproducing apparatus for reproducing a recording medium on which at least sound data of a plurality of music pieces have been recorded, wherein said apparatus comprises:

memory means for storing music piece classification information for said music pieces recorded on said recording medium, wherein said music piece classification information represents at least one characteristic of said plurality of music pieces and comprises a plurality of different items;

selection means for generating an item content selection command to select at least one item of said items of said music piece classification information in accordance with a selection operation; and searching means for searching said memory means for at least one particular music piece corresponding to said at least one item selected by said item content selection command, wherein said selection means generates said item content selection command based on a selection item which represents a classification of said music pieces that is different from said items contained in the music piece classification information.

17. An apparatus according to claim 16, wherein said selection means makes a determination regarding which of said items contained in said music piece classification information correspond to said selection item and generates said item content selection command based on said determination.

18. A recording medium reproducing apparatus which can generate data to control an external apparatus simultaneously with the reproduction of a sound, comprising:

a recording medium on which at least sound data of a plurality of music pieces, control set information of said external apparatus, and real-time data for said plurality of music pieces have been recorded;

means for generating a selection music piece command to indicate one music piece of said plurality of music pieces in accordance with a selection operation;

playing means for playing said recording medium with respect to said one music piece according to said selection music piece command; and means for reading said control set information according to said selection music piece command before said playing means begins playing said recording medium and for setting the external apparatus into a set state corresponding to said control set information read by said means for reading.

19. An apparatus according to claim 18, wherein said control set information is control device information indicative of an ability of said external apparatus to be controlled by said real-time data.

20. An apparatus according to claim 18, wherein said external apparatus is a background video image apparatus for generating a background signal indicative of a background video image of a character image which is displayed on a display, wherein said control set information is background video image information indicative of a kind of said background signal to be generated by said background video image apparatus, and wherein said kind of said background signal represents a type of background video image to be displayed on said display.

21. An apparatus according to claim 18, wherein said external apparatus is a DSP for processing audio data and said control set information is DSP mode information used to set an operating mode of said DSP.

22. A recording medium reproducing apparatus which can control an external apparatus simultaneously with the reproduction of a sound, comprising:

a recording medium on which at least sound data of a plurality of music pieces, portions of video data, and portions of real-time data are recorded, wherein said portions of real-time data correspond to said plurality of music pieces such that said portions of real-time data change when one music piece of said plurality of music pieces is played and wherein said portions of video data correspond to said plurality of music pieces;

means for generating a selection music piece command to indicate a selected music piece of said plurality of music pieces in accordance with a selection operation;

playing means for playing said recording medium with respect to said selected music piece according to said selection music piece command and for outputting one portion of said portions of real-time data simultaneously with the reproduction of said sound data;

means for outputting at least one of said portions of video data to a display when said playing means plays said recording medium; and converting means for converting said one portion of real-time data output from said playing means into converted data and for supplying said converted data to said external apparatus as a control signal.

23. An apparatus according to claim 22, wherein control information has been recorded in a head portion of said recording medium for each of said plurality of music pieces, wherein said playing means reads the control information from said recording medium before the reproduction of the sound data according to said selection music piece command, and wherein said converting means converts the portion of real-time data according to the control information read from said recording medium.

24. A recording medium for playing in a recording medium reproducing apparatus which comprises means for generating a selection music piece command to select one music piece of a plurality of music pieces in accordance with a selection operation and playing means for playing said one music piece according to said selection music piece command, said recording medium comprising:

at least an information area in which information relating to music pieces are recorded on said recording medium, said information relating to music pieces including music classification information; and at least a data area in which at least sound data of said music pieces recorded on said recording medium is recorded, wherein said information area and said data area together constitute an information recording area of said recording medium, wherein said music classification information constitutes a search criteria which is evaluated during said selection operation to enable said recording medium reproducing apparatus to select said one music piece of said plurality of music pieces.

25. A recording medium as claimed in claim 24, wherein said music classification information comprises theme information for said music pieces which corresponds to the themes of said music pieces.

26. A recording medium as claimed in claim 24, wherein said music classification information comprises situation information for said music pieces which corresponds to situations of said music pieces.

27. A recording medium as claimed in claim 24, wherein said music classification information comprises genre information for said music pieces which corresponds to genres of said music pieces.

28. A recording medium as claimed in claim 24, wherein said music classification information comprises control information for said music pieces which indicates various external apparatuses which can be controlled by control data recorded on said recording medium.

29. A recording medium for playing in a recording medium reproducing apparatus which comprises means for generating a selection music piece command to select one music piece of a plurality of music pieces in accordance with a selection operation and playing means for playing said one music piece according to said selection music piece command, said recording medium comprising:

at least an information area in which information relating to music pieces are recorded on said recording medium, said information including control information for controlling an external apparatus and portions of video information, wherein said portions of video data correspond to said music pieces; and at least a data area in which at least sound data of said music pieces recorded on said recording medium is recorded, wherein said information area and said data area together constitute an information recording area of said recording medium.

30. A recording medium according to claim 29, wherein said information in said information area further includes music title name information for said music pieces.

31. A recording medium as claimed in claim 29, wherein said external apparatus comprises an illuminating apparatus for illuminating at least one light, and wherein said illuminating apparatus is different from a display on which words relating to said one music piece are displayed when said one music piece is played by said playing means.

32. A recording medium as claimed in claim 29, wherein said external apparatus is a DSP for processing audio data corresponding to said one music piece when said one music piece is played by said playing means.

* * * * *